(12) United States Patent
Terada et al.

(10) Patent No.: US 10,142,624 B2
(45) Date of Patent: ***Nov. 27, 2018

(54) IMAGE CODING METHOD, IMAGE CODING APPARATUS, IMAGE DECODING METHOD, IMAGE DECODING APPARATUS, AND IMAGE CODING AND DECODING APPARATUS

(71) Applicant: Velos Media, LLC, Plano, TX (US)

(72) Inventors: Kengo Terada, Osaka (JP); Youji Shibahara, Osaka (JP); Kyoko Tanikawa, Osaka (JP); Hisao Sasai, Osaka (JP); Toshiyasu Sugio, Osaka (JP); Toru Matsunobu, Osaka (JP)

(73) Assignee: Velos Media, LLC, Plano, TX (US)

( * ) Notice: Subject to any disclaimer, the term of this patent is extended or adjusted under 35 U.S.C. 154(b) by 596 days.

This patent is subject to a terminal disclaimer.

(21) Appl. No.: 14/509,199

(22) Filed: Oct. 8, 2014

(65) Prior Publication Data

US 2015/0030085 A1    Jan. 29, 2015

Related U.S. Application Data

(62) Division of application No. 13/898,783, filed on May 21, 2013, now Pat. No. 8,929,437.

(Continued)

(51) Int. Cl.
*H04N 19/70* (2014.01)
*H04N 19/91* (2014.01)
(Continued)

(52) U.S. Cl.
CPC ....... *H04N 19/00884* (2013.01); *H04N 19/13* (2014.11); *H04N 19/20* (2014.11);
(Continued)

(58) Field of Classification Search
CPC ........... H04N 19/00884; H04N 19/117; H04N 19/13; H04N 19/20; H04N 19/70; H04N 19/82; H04N 19/91
See application file for complete search history.

(56) References Cited

U.S. PATENT DOCUMENTS 6,900,748 B2   5/2005  Marpe et al.
7,088,271 B2   8/2006  Marpe et al.
(Continued)

FOREIGN PATENT DOCUMENTS

CN     1949873       4/2007
JP     2007-142637   6/2007
(Continued)

OTHER PUBLICATIONS

Benjamin Bross,High efficiency video coding (HEVC) text specification draft 6, Feb. 10, 2012, Draft 6.*
(Continued)

*Primary Examiner* — Md Haque
(74) *Attorney, Agent, or Firm* — Nixon & Vanderhye P.C.

(57) ABSTRACT

The image coding method for coding an input image includes: converting, into a bin string, an offset value used in an offset process to be applied to a pixel value of a reconstructed image corresponding to the input image; and performing bypass arithmetic coding on the bin string using a fixed probability.

11 Claims, 37 Drawing Sheets

Related U.S. Application Data

(60) Provisional application No. 61/651,649, filed on May 25, 2012.

(51) Int. Cl.
*H04N 19/20* (2014.01)
*H04N 19/13* (2014.01)
*H04N 19/117* (2014.01)
*H04N 19/82* (2014.01)

(52) U.S. Cl.
CPC ............ *H04N 19/91* (2014.11); *H04N 19/117* (2014.11); *H04N 19/70* (2014.11); *H04N 19/82* (2014.11)

(56) References Cited

U.S. PATENT DOCUMENTS

| | | |
|---|---|---|
| 7,535,387 B1 | 5/2009 | Delva |
| 7,860,160 B2 | 12/2010 | Shimazaki et al. |
| 8,581,753 B2 | 11/2013 | Kim et al. |
| 8,781,001 B2 | 7/2014 | Sasai et al. |
| 8,837,582 B2 | 9/2014 | He et al. |
| 8,907,823 B2 | 12/2014 | Marpe et al. |
| 8,947,273 B2 | 2/2015 | Bartnik et al. |
| 9,042,440 B2 | 5/2015 | Sole Rojals et al. |
| 9,749,623 B2 | 8/2017 | Sasai et al. |
| 2001/0017944 A1 | 8/2001 | Kalevo et al. |
| 2005/0012648 A1 | 1/2005 | Marpe et al. |
| 2005/0038837 A1 | 2/2005 | Marpe et al. |
| 2006/0028359 A1 | 2/2006 | Kim et al. |
| 2006/0280371 A1 | 12/2006 | Shimazaki et al. |
| 2006/0285757 A1 | 12/2006 | Abe et al. |
| 2007/0040711 A1 | 2/2007 | Ziauddin |
| 2007/0080832 A1 | 4/2007 | Yang et al. |
| 2007/0171985 A1 | 7/2007 | Kim et al. |
| 2008/0063084 A1 | 3/2008 | Xue et al. |
| 2009/0089549 A1 | 4/2009 | Liu et al. |
| 2009/0195681 A1 | 8/2009 | Compton et al. |
| 2011/0228858 A1 | 9/2011 | Budagavi et al. |
| 2011/0243226 A1 | 10/2011 | Choi et al. |
| 2011/0310958 A1 | 12/2011 | Sachdeva et al. |
| 2012/0014454 A1 | 1/2012 | Budagavi et al. |
| 2012/0027083 A1 | 2/2012 | Narroschke et al. |
| 2012/0057637 A1 | 3/2012 | Flachs et al. |
| 2012/0069906 A1 | 3/2012 | Sato |
| 2012/0127002 A1 | 5/2012 | Shibahara et al. |
| 2012/0170647 A1 | 7/2012 | He et al. |
| 2012/0177107 A1 | 7/2012 | Fu et al. |
| 2012/0294353 A1 | 11/2012 | Fu et al. |
| 2012/0300839 A1 | 11/2012 | Sze et al. |
| 2012/0320971 A1 | 12/2012 | Xu |
| 2012/0328001 A1 | 12/2012 | He et al. |
| 2013/0003824 A1 | 1/2013 | Guo et al. |
| 2013/0003838 A1 | 1/2013 | Gao et al. |
| 2013/0003840 A1 | 1/2013 | Gao et al. |
| 2013/0003849 A1 | 1/2013 | Chien et al. |
| 2013/0016777 A1 | 1/2013 | Gao et al. |
| 2013/0027230 A1 | 1/2013 | Marpe et al. |
| 2013/0064294 A1 | 3/2013 | Sole Rojals et al. |
| 2013/0083856 A1 | 4/2013 | Sole Rojals et al. |
| 2013/0107951 A1 | 5/2013 | Sole Rojals et al. |
| 2013/0114668 A1 | 5/2013 | Misra et al. |
| 2013/0114674 A1* | 5/2013 | Chong ................... H04N 19/86 375/240.02 |
| 2013/0114691 A1 | 5/2013 | Guo et al. |
| 2013/0114693 A1 | 5/2013 | Gao et al. |
| 2013/0114716 A1 | 5/2013 | Gao et al. |
| 2013/0114738 A1 | 5/2013 | Chien et al. |
| 2013/0128966 A1 | 5/2013 | Gao et al. |
| 2013/0129238 A1 | 5/2013 | Sasai et al. |
| 2013/0136375 A1 | 5/2013 | Sasai et al. |
| 2013/0177069 A1* | 7/2013 | Sze ........................ H04N 19/13 375/240.02 |
| 2013/0187796 A1 | 7/2013 | Kim et al. |
| 2013/0188734 A1 | 7/2013 | Kim et al. |
| 2013/0223542 A1 | 8/2013 | Kim et al. |
| 2013/0272389 A1 | 10/2013 | Sze et al. |
| 2013/0294501 A1 | 11/2013 | Sze et al. |
| 2013/0315297 A1* | 11/2013 | Sasai ................ H04N 19/00127 375/240.02 |
| 2013/0336382 A1 | 12/2013 | Sole Rojals et al. |
| 2013/0336388 A1* | 12/2013 | Terada ................... H04N 19/91 375/240.03 |
| 2014/0140400 A1 | 5/2014 | George et al. |
| 2014/0210652 A1 | 7/2014 | Bartnik et al. |
| 2014/0307778 A1 | 10/2014 | He et al. |
| 2014/0334559 A1 | 11/2014 | Kim et al. |
| 2015/0098513 A1 | 4/2015 | Fu et al. |
| 2015/0172666 A1 | 6/2015 | Fu et al. |

FOREIGN PATENT DOCUMENTS

| | | |
|---|---|---|
| JP | 2010-219842 | 9/2010 |
| JP | 2012-23613 | 2/2012 |
| JP | 2012-23715 | 2/2012 |
| RU | 2 358 410 | 6/2009 |
| RU | 2 370 816 | 10/2009 |
| RU | 2 439 682 | 1/2012 |
| TW | 200939760 | 9/2009 |
| TW | 201130315 | 9/2011 |
| TW | 201134225 | 10/2011 |
| TW | 2011324225 | 10/2011 |
| WO | 2008/002897 | 1/2008 |

OTHER PUBLICATIONS

Detkv Marpe, Context-Based Adaptive Binary Arithmetic Coding in the H.264/AVC Video Compression Standard, Jul. 7, 2003.*
Vivienne Sze, "Reduction in context coded bins for ref_idx and cu_qo_delta", Joint Collaborative Team on Video Coding (JCT-VC) of ITU-T SG16 WP3 and ISO/IEC JTC1/SC29/WG11, JCTVC-I0204, 9th Meeting: Geneva, CH, Apr. 27-May 7, 2012.
Yu-Wen Huang, "BoG report on intergrated text of SAO adoptions on top of JCTVC-I0030", Joint Collaborative Team on Video Coding (JCT-VC) of ITU-T SG16 WP3 and ISO/IEC JTC1/SC29/WG11, JCTVC-I0602, 9th Meeting: Geneva, CH, Apr. 27-May 7, 2012.
Vadim Seregin, "Binarisation modification for last position coding", Joint Collaborative Team on Video Coding (JCT-VC) of ITU-T SG16 WP3 and ISO/EC JCT1/SC29/WG11, JCTVC-F375, 6th Meeting, : Torino, IT, Jul. 14-22, 2011.
Hisao Sasai, "Modified MVD coding for CABAC", Joint Collaborative Team on Video Coding (JCT-VC) of ITU-T SG16 WP3 and ISO/IEC JTC1/SC29/WG11 JCTVC-F423, 6th Meeting: Torino, IT, Jul. 14-22, 2011.
Benjamin Bross et al., "Suggested bug-fixes for HEVC text specification draft 6", Joint Collaborative Team on Video Coding (JCT-VC) of ITU-T SG16 WP3 and ISO/IEC JTC1/SC29/WG11, JCTVC-I0030, 9th Meeting: Geneva, CH, Apr. 27-May 7, 2012.
Benjamin Bross et al., "High efficiency video coding (HEVC) text specification draft 7", Joint Collaborative Team on Video Coding (JCT-VC) of ITU-T SG16 WP3 and ISO/IEC JTC1/SC29/WG11, JCTVC-I1003_d1, Ver.2, 9th Meeting: Geneva, CH, Apr. 27-May 7, 2012.
"Advanced video coding for generic audiovisual services", ITU-T Recommendation H.264, Mar. 2010.
Benjamin Bross et al., "High efficiency video coding (HEVC) text specification draft 7", Joint Collaborative Team on Video Coding (JCT-VC) of ITU-T SG16 WP3 and ISO/IEC JTC1/SC29/WG11, JCTVC-I1003_d2, Ver.3, 9th Meeting: Geneva, CH, Apr. 27-May 7, 2012.
Vadim Seregin et al., "Bypass bins for reference index and delta QP coding", Joint Collaborative Team on Video Coding (JCT-VC) of ITU-T SG16 WP3 and ISO/IEC JTC1/SC29/WG11, JCTVC-I0594, 9th Meeting: Geneva, CH, Apr. 27-May 7, 2012.
Benjamin Bross et al., "High efficiency video coding (HEVC) text specification draft 6", Joint Collaborative Team on Video Coding

(56) References Cited

OTHER PUBLICATIONS (JCT-VC) of ITU-T SG16 WP3 and ISO/IEC JTC1/SC29/WG11, JCTVC-H1003, 8th Meeting: San José, CA, USA, Feb. 1-10, 2012.
Benjamin Bross et al., "Suggested bug-fixes for HEVC text specification draft 6", Joint Collaborative Team on Video Coding (JCT-VC) of ITU-T SG16 WP3 and ISO/IEC JTC1/SC29/WG11, JCTVC-I0030, 9th Meeting: Geneva, CH, Apr. 27-May 7, 2012, Version 4.
Chih-Ming Fu et al., "Non-CE1: Bug-fix of offset coding in SAO interleaving mode", Joint Collaborative Team on Video Coding (JCT-VC) of ITU-T SG16 WP3 and ISO/IEC JTC1/SC29/WG11, JCTVC-I0168, ITU-T, Apr. 27, 2012, pp. 1-3.
Yu-Wen Huang, "BoG report on SAO", Joint Collaborative Team on Video Coding (JCT-VC) of ITU-T SG16 WP3 and ISO/IEC JTC1/SC29/WG11, JCTVC-I0576, ITU-T, May 4, 2012, pp. 1-12.
Written Opinion of the International Searching Authority dated Jul. 9, 2013 in International (PCT) Application No. PCT/JP2013/002396 (with English translation).
International Search Report dated Aug. 6, 2013 in International (PCT) Application No. PCT/JP2013/003113.
International Search Report dated Aug. 20, 2013 in International (PCT) Application No. PCT/JP2013/003158.
International Search Report dated Aug. 20, 2013 in International (PCT) Application No. PCT/JP2013/003141.
International Search Report dated Jul. 9, 2013 in International (PCT) Application No. PCT/JP2013/002396.
Search Report dated Jun. 14, 2016 in Taiwanese Patent Application No. 102117757, with English translation.
Extended European Search Report dated Mar. 27, 2015 in European Application No. 13800607.7.
Extended European Search Report dated Mar. 27, 2015 in European Application No. 13793080.6.
Extended European Search Report dated Jul. 27, 2015 in European Application No. 13794340.3.
E. Maani et al., "SAO Type Coding Simplification", Joint Collaborative Team on Video Coding (JCT-VC) of ITU-T SG16 WP3 and ISO/IEC JTC1/SC29/WG11, JCTVC-I0246, 9th Meeting: Geneva, CH, Apr. 27-May 7, 2012, XP030052835.
Toru Matsunobu et al., "AHG5/AHG6: Bypass coding for SAO syntax elements", Joint Collaborative Team on Video Coding (JCT-VC) of ITU-T SG16 WP3 and ISO/IEC JTC1/SC29/WG11, JCTVC-J0148, 10th Meeting: Stockholm, Sweden, Jul. 11-20, 2012, XP030112510.
C. Rosewarne et al., "AHG5: On SAO syntax elements coding", Joint Collaborative Team on Video Coding (JCT-VC) of ITU-T SG16 WP3 and ISO/IEC JTC1/SC29/WG11, JCTVC-J0178, XP030112540.

Akira Minezawa et al., "Non-CE1: Improved edge offset coding for SAO", Joint Collaborative Team on Video Coding (JCT-VC) of ITU-T SG16 WP3 and ISO/IEC JTC1/SC29/WG11, JCTVC-I0066, 9th Meeting: Geneva, CH, Apr. 27-May 7, 2012, XP030111829.
Joel Sole et al., "AhG6: Bypass bins grouping in SAO", Joint Collaborative Team on Video Coding (JCT-VC) of ITU-T SG16 WP3 and ISO/IEC JTC1/SC29/WG11, JCTVC-J0054, 10th Meeting: Stockholm, SE, Jul. 11-20, 2012, XP030112416.
Akira Minezawa et al., "Non-CE1: Improved edge offset coding for SAO", Joint Collaborative Team on Video Coding (JCT-VC) of ITU-T SG16 WP3 and ISO/IEC JTC1/SC29/WG11, JCTVC-I0066_r2, 9th Meeting: Geneva, CH, Apr. 27-May 7, 2012, XP030052650.
Guillaume Laroche et al., "Non-CE1: On SAO parameters reduction for Chroma", Joint Collaborative Team on Video Coding (JCT-VC) of ITU-T SG16 WP3 and ISO/IEC JTC1/SC29/WG11, JCTVC-I0183, 9th Meeting: Geneva, CH, Apr. 27-May 7, 2012, XP030111946.
Detlev Marpe et al., "Context-Based Adaptive Binary Arithmetic Coding in the H.264/AVC Video Compression Standard", IEEE Transactions on Circuits and Systems for Video Technology, vol. 13, No. 7, Jul. 1, 2013, pp. 620-636, XP055120073.
Woo-Shik Kim et al., "AhG6: SAO Offset Bypass Coding", Joint Collaborative Team on Video Coding (JCT-VC) of ITU-T SG16 WP3 and ISO/IEC JTC1/SC29/WG11, JCTVC-J0141, 10th Meeting: Stockholm, SE, Jul. 11-20, 2012, XP030112503.
Examination Report dated Jan. 17, 2017 in Singapore Patent Application No. 201400081-4.
Singapore Search and Examination Report dated Mar. 13, 2018 in SG Application No. 10201608592U, 7 pages.
English translation of Chinese Second Office Action dated Nov. 17, 2017 in CN 201380002084.6, 7 pages.
Chinese First Office Action dated May 2, 2017 in CN 201380002084.6 and English translation, 18 pages.
Notice of Allowance dated Apr. 25, 2017 in U.S. Appl. No. 13/898,722.
Vivienne Sze et al., "Reduction in context coded bins for ref_idx and cu_qp_delta", Joint Collaborative Team on Video Coding (JCT-VC) of ITU-T SG16 WP3 and ISO/IEC JTC1/SC29/WG11, JCTVC-I0204, 9th Meeting: Geneva, CH, Apr. 27-May 7, 2012, pp. 1-5.
Office Action dated Oct. 20, 2016 in U.S. Appl. No. 13/898,722.
Office Action dated Oct. 27, 2016 in U.S. Appl. No. 13/897,975.
Office Action dated Aug. 7, 2018 in JP Application No. 2017-132865, 3 pages.
Office Action dated Aug. 3, 2018 in RU Application No. 2017133923, 2 pages.
Search Report dated Aug. 3, 2018 in RU Application No. 2017133923, 2 pages.

* cited by examiner

FIG. 7

| Non-binary signal | Bin string |||||||
|---|---|---|---|---|---|---|---|
| | binIdx |||||||
| | 0 | 1 | 2 | 3 | 4 | 5 | 6 |
| 0 | 0 | | | | | | |
| 1 | 1 | 0 | | | | | |
| 2 | 1 | 1 | 0 | | | | |
| 3 | 1 | 1 | 1 | 0 | | | |
| 4 | 1 | 1 | 1 | 1 | 0 | | |
| 5 | 1 | 1 | 1 | 1 | 1 | 0 | |
| 6 | 1 | 1 | 1 | 1 | 1 | 1 | 0 |
| 7 | 1 | 1 | 1 | 1 | 1 | 1 | 1 |

FIG. 8

| | binIdx | | | | | | |
|---|---|---|---|---|---|---|---|
| | 0 | 1 | 2 | 3 | 4 | 5 | 6 |
| Embodiment 1 | Context 0 | Context 1 | Bypass | | | | |
| Change 1 | Context 0 | | Bypass | | | | |
| Change 2 | | | Bypass | | | | |

FIG. 9

|  | Main | | | HE10 | | |
| --- | --- | --- | --- | --- | --- | --- |
|  | AI | RA | LB | AI | RA | LB |
| Embodiment 1 | 0.00 | -0.01 | 0.02 | 0.01 | 0.05 | 0.04 |
| Change 1 | 0.01 | 0.04 | 0.08 | 0.01 | 0.07 | 0.07 |
| Change 2 | 0.03 | 0.04 | 0.07 | 0.01 | 0.06 | 0.07 |

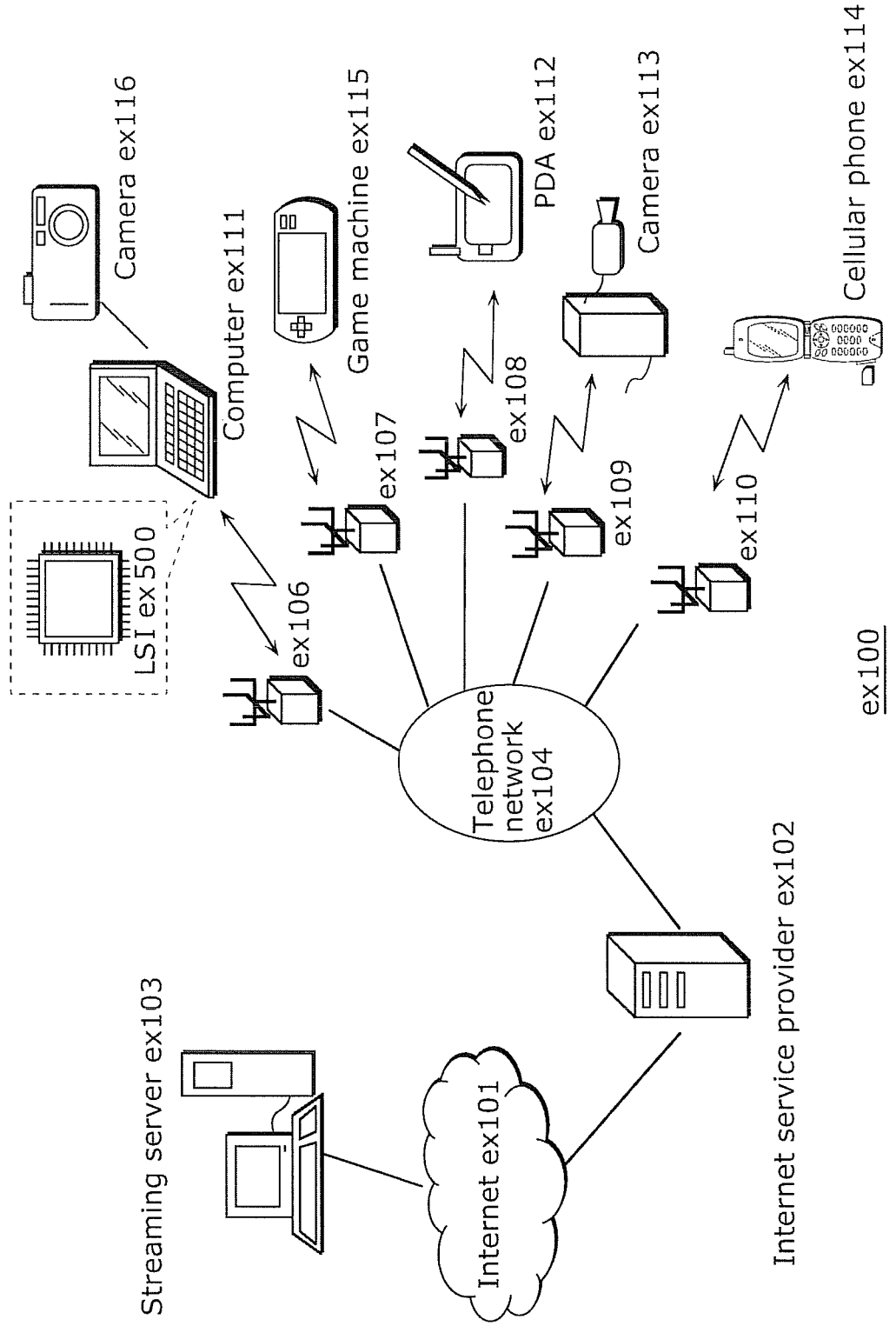

FIG. 22

| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 33

| Corresponding standard | Driving frequency |
|---|---|
| MPEG-4 AVC | 500 MHz |
| MPEG-2 | 350 MHz |
| ⋮ | ⋮ |

# IMAGE CODING METHOD, IMAGE CODING APPARATUS, IMAGE DECODING METHOD, IMAGE DECODING APPARATUS, AND IMAGE CODING AND DECODING APPARATUS

FIELD

One or more exemplary embodiments disclosed herein relate to an image coding method, an image coding apparatus, an image decoding method, an image decoding apparatus, and an image coding and decoding apparatus, and in particular to an image coding method, an image coding apparatus, an image decoding method, an image decoding apparatus, and an image coding and decoding apparatus for performing arithmetic coding or arithmetic decoding on a sample adaptive offset (SAO) parameter.

BACKGROUND

Recent years have seen the significant technical development in digital video apparatuses, and increasing chances for compression-coding a video signal (a plurality of images arranged in time series) and recording the video signal onto recording media such as DVDs and hard disks or distributing the video signal on the Internet. For example, the H.264/AVC (MPEG-4 AVC) is one of the standards for compression-coding a video signal. Furthermore, the High Efficiency Video Coding (HEVC) standard is currently being considered as a next-generation standard.

The current HEVC standard (NPL 1) has an offset process called SAO. The SAO process is a process for adding an offset value to each pixel of an image decoded from a bitstream (coded bitstream). Performing the SAO process enables reduction in image degradation by coding and making the decoded image more similar to the original image. In accordance with the current HEVC standard, the arithmetic coding is performed on an offset value in the SAO process, and the offset value is added to the bitstream.

CITATION LIST

Non Patent Literature

[NPL 1] Joint Collaborative Team on Video Coding (JCT-VC) of ITU-T SG16 WP3 and ISO/IEC JTC1/SC29/WG11, 9th Meeting: Geneva, CH, 27 Apr.-7 May 2012, JCTVC-I0602_CDTexts_r2.doc, BoG report on integrated text of SAO adoptions on top of JCTVC-I0030, http://phenix.it-sudparis.eu/jct/doc_end_user/documents/9_Geneva/wg11/JCTVC-I0602-v3.zip

SUMMARY

Technical Problem

In the conventional technique, accelerated processing is desired in coding and decoding an image.

Here, one or more exemplary embodiments provide an image coding method and an image decoding method in which the processing can be accelerated.

Solution to Problem

The image coding method according to an aspect of the present disclosure is an image coding method for coding an input image, and includes: converting, into a bin string, an offset value used in an offset process to be applied to a pixel value of a reconstructed image corresponding to the input image; and performing bypass arithmetic coding on the bin string using a fixed probability.

Furthermore, the image decoding method according to another aspect of the present disclosure is an image decoding method for decoding a coded image, and includes: performing bypass arithmetic decoding on a bin string using a fixed probability, the bin string being coded and indicating an offset value used in an offset process to be applied to a pixel value of a reconstructed image corresponding to the coded image; and converting, into the offset value, the bin string on which the bypass arithmetic decoding is performed. These general or specific aspects of the present disclosure may be implemented by a system, an apparatus, an integrated circuit, a computer program, a computer-readable recording medium, such as a CD-ROM, or an arbitrary combination of the system, the apparatus, the integrated circuit, the computer program, and the recording medium.

Advantageous Effects

With the image coding method, the image coding apparatus, the image decoding method, the image decoding apparatus, and the image coding and decoding apparatus according to the present invention, the processing can be accelerated.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 7 is a table indicating an example correspondence between non-binary signals and bin strings.

FIG. 8 is a table indicating a correspondence between bins included in a binIdx and arithmetic coding to be applied.

FIG. 9 is a table showing a result of experiment on coding efficiency according to Embodiment 1 and Variation 1.

FIG. 16 illustrates an overall configuration of a content providing system for implementing content distribution services.

FIG. 22 illustrates a structure of multiplexed data.

FIG. 33 illustrates an example of a look-up table in which the standards of video data are associated with the driving frequencies.

Figure 1:
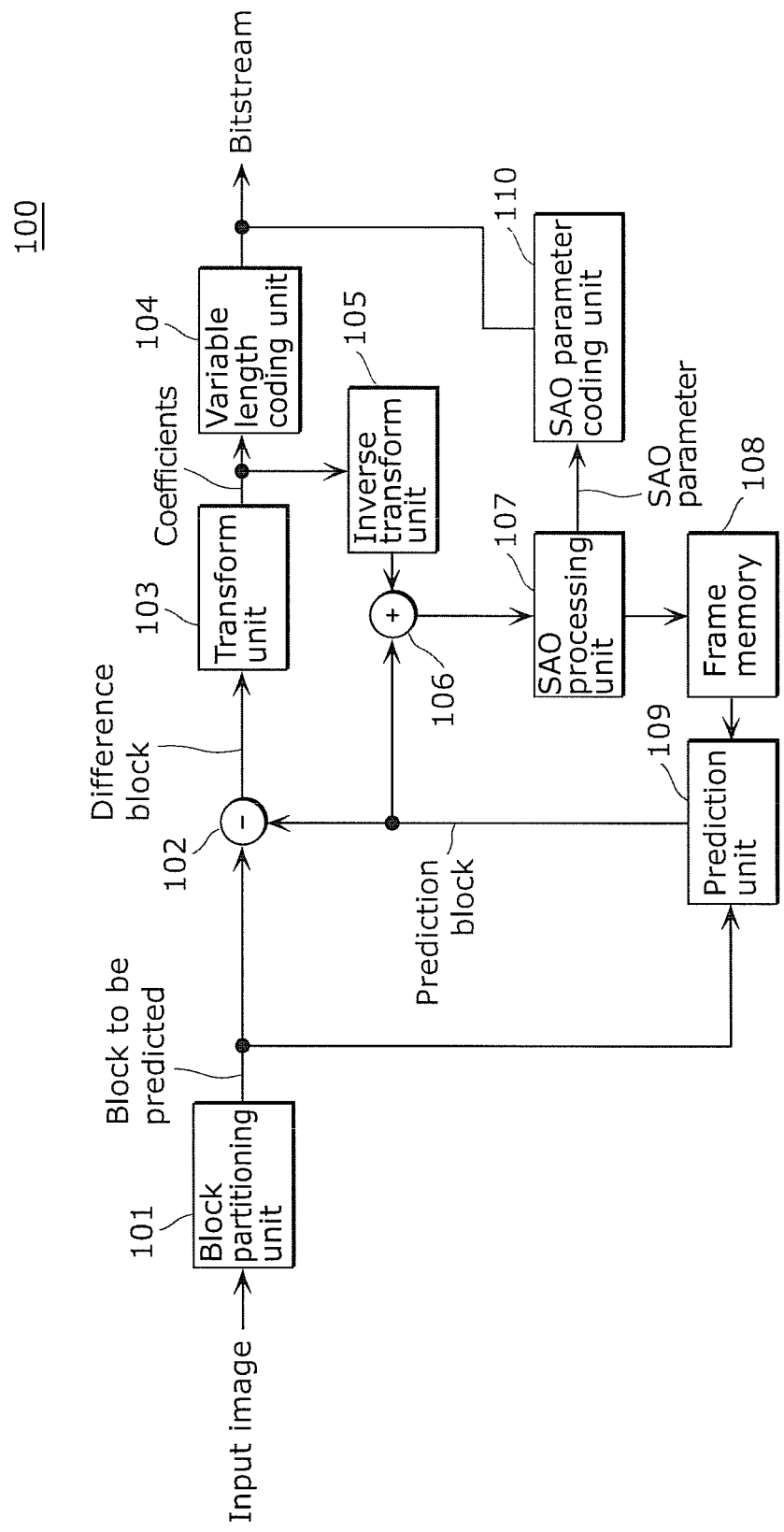
FIG. 1 is a block diagram illustrating an example configuration of an image coding apparatus according to Embodiment 1.

DESCRIPTION OF EMBODIMENTS (Knowledge on which the present disclosure is based)

The Inventors have found that the image coding method and others described in "Background Art" have the following problems.

As described above, in accordance with the current HEVC standard, the arithmetic coding is performed on an offset value in an SAO process that is an offset process, and the offset value is added to the bitstream. More specifically, in the arithmetic coding of the HEVC standard, a signal to be coded (for example, SAO offset value) is converted from a non-binary signal to a bin string, and the arithmetic coding is performed on the bin string.

The arithmetic coding has two types: (1) context arithmetic coding in which arithmetic coding is performed using an adaptive symbol occurrence probability; and (2) bypass arithmetic coding in which arithmetic coding is performed by fixing a symbol occurrence probability to, for example, 50%.

(1) In the context arithmetic coding, a context is selected per signal to be coded. The symbol occurrence probability is determined according to the context. Furthermore, in the context arithmetic coding, the selected context is loaded, and the arithmetic coding is performed on the signal to be coded, based on a symbol occurrence probability corresponding to the loaded context. Furthermore, in the context arithmetic coding, the context updating process for updating the symbol occurrence probability (for example, probabilities of occurrence of 1) of the context is performed according to a value of the signal to be coded.

(2) In contrast, in the bypass arithmetic coding, arithmetic coding is performed on the signal to be coded by fixing the symbol occurrence probability to, for example, 50% without using any context. Thus, the bypass arithmetic coding does not require loading and updating the context.

Conventionally, the image coding apparatus performs the context arithmetic coding on an SAO offset value. This is because the symbol occurrence probability of a bin string indicating an SAO offset value probably has a bias in accordance with the HEVC standard (NPL 1). When the symbol occurrence probability has the bias, decrease in the coding efficiency can be suppressed using the context arithmetic coding.

However, the context arithmetic coding requires processing, such as loading and updating the context. Furthermore, when the context identical to the context selected in the context arithmetic coding on a predetermined SAO offset value is selected in the context arithmetic coding on another SAO offset value, until the context for the SAO offset value on which the arithmetic coding has been first performed is updated, the context arithmetic coding on the next SAO offset value cannot be started. Thus, problems with the sequential processes and reduction in the throughput occur.

In order to solve such problems, the image coding method according to an aspect of the present disclosure is an image coding method for coding an input image, and includes: converting, into a bin string, an offset value used in an offset process to be applied to a pixel value of a reconstructed image corresponding to the input image; and performing bypass arithmetic coding on the bin string using a fixed probability.

Since in the image coding method, arithmetic coding is performed on an SAO offset value using the bypass arithmetic coding, the processing can be accelerated.

The Inventors have found that the symbol occurrence probabilities of bin strings each indicating an SAO offset value have little biases, which will be described later. Thus, the coding efficiency does not probably decrease even when the bypass arithmetic coding is performed. Thus, the Inventors have verified in the experiment that the bypass arithmetic coding as the arithmetic coding on an SAO offset value does not decrease the coding efficiency.

Thus, the image coding method with the configuration enables acceleration of the processing without lowering the coding efficiency.

Furthermore, the image decoding method according to another aspect of the present disclosure is an image decoding method for decoding a coded image, and includes: performing bypass arithmetic decoding on a bin string using a fixed probability, the bin string being coded and indicating an offset value used in an offset process to be applied to a pixel value of a reconstructed image corresponding to the coded image; and converting, into the offset value, the bin string on which the bypass arithmetic decoding is performed.

Furthermore, the image coding apparatus according to another aspect of the present disclosure is an image coding apparatus that codes an input image, and includes a control circuit and storage electrically connected to the control circuit, wherein the control circuit executes: converting, into a bin string, an offset value used in an offset process to be applied to a pixel value of a reconstructed image corresponding to the input image; and performing bypass arithmetic coding on the bin string using a fixed probability.

Furthermore, the image decoding apparatus according to another aspect of the present disclosure is an image decoding apparatus that decodes a coded image, and includes a control circuit and storage electrically connected to the control circuit, wherein the control circuit executes: performing bypass arithmetic decoding on a bin string using a fixed probability, the bin string being coded and indicating an offset value used in an offset process to be applied to a pixel value of a reconstructed image corresponding to the coded image; and converting, into the offset value, the bin string on which the bypass arithmetic decoding is performed.

Furthermore, an image coding and decoding apparatus according to another aspect of the present disclosure includes the image coding apparatus and the image decoding apparatus.

These general or specific aspects of the present disclosure may be implemented by a system, a method, an integrated circuit, a computer program, a computer-readable recording medium, such as a CD-ROM, or an arbitrary combination of the system, the method, the integrated circuit, the computer program, and the recording medium.

Embodiments according to the present disclosure will be described with reference to the drawings.

Embodiments described hereinafter indicate specific or generic examples of the present disclosure. The values, shapes, materials, constituent elements, positions and connections of the constituent elements, steps, and orders of the steps indicated in Embodiments are examples, and do not limit the present disclosure. The constituent elements in Embodiments that are not described in independent Claims that describe the most generic concept of the present disclosure are described as arbitrary constituent elements.

(Embodiment 1)

An image coding apparatus and an image coding method according to Embodiment 1 will be described with reference to FIGS. 1 to 9

<1-1. Configuration of Apparatus>

The image coding apparatus according to Embodiment 1 will be described with reference to FIG. 1. FIG. 1 is a block diagram illustrating a configuration of an image coding apparatus 100 in accordance with the HEVC standard according to Embodiment 1.

The image coding apparatus 100 is an apparatus that codes an image to be input (input image) per block to generate a bitstream (coded bit stream).

As illustrated in FIG. 1, the image coding apparatus 100 includes a block partitioning unit 101, a subtracting unit 102, a transform unit 103, a variable length coding unit (entropy coding unit) 104, an inverse transform unit 105, an adding unit 106, an SAO processing unit 107, an SAO parameter coding unit 110, a frame memory 108, and a prediction unit 109.

The block partitioning unit 101 partitions the input image into blocks to be predicted and each including pixels. The blocks to be predicted are blocks variable in size. For example, the minimum size of the blocks is 4×4 pixels, and the maximum size of the blocks is 32×32 pixels.

The subtracting unit 102 subtracts, from each of the blocks to be predicted, a prediction block predicted by the prediction unit 109 to be described later to calculate a difference block. The transform unit 103 transforms the difference block from an image domain to a frequency domain to derive frequency coefficients, and quantizes the frequency coefficients. The quantized frequency coefficients will be referred to as quantized coefficients hereinafter.

The variable length coding unit 104 performs entropy coding on the quantized coefficients output from the transform unit 103 and on various information necessary for decoding (partitioning information for the blocks to be predicted, a type of prediction, a motion vector, a prediction mode (intra prediction mode), a quantized parameter, etc.) to generate a bitstream.

The inverse transform unit 105 performs inverse quantization for transforming the quantized coefficients output from the transform unit 103 into the frequency coefficients, and performs inverse transform for transforming the frequency coefficients from the frequency domain to the image domain to derive a reconstructed difference block. The adding unit 106 adds the prediction block predicted by the prediction unit 109 to be described later to the reconstructed difference block derived by the inverse transform unit 105 to generate a reconstructed block.

The SAO processing unit 107 performs the SAO process (offset process) on the reconstructed block for adding, to a pixel value of each pixel included in the reconstructed block, an SAO offset value corresponding to a category (class) to which the pixel belongs, which will be described later. Since the process performed by the transform unit 103 is an irreversible process, an error occurs between each of the blocks to be predicted in the input image and the reconstructed block. The SAO offset value is a value for correcting the error, and is set per category.

The SAO parameter coding unit 110 performs variable length coding on various parameters to be used in the SAO process, and adds the parameters to the bitstream output from the variable length coding unit 104. Embodiment 1 exemplifies sao_offset indicating the SAO offset value and sao_type_idx indicating a category of the SAO offset value, as SAO parameters.

Figure 2:
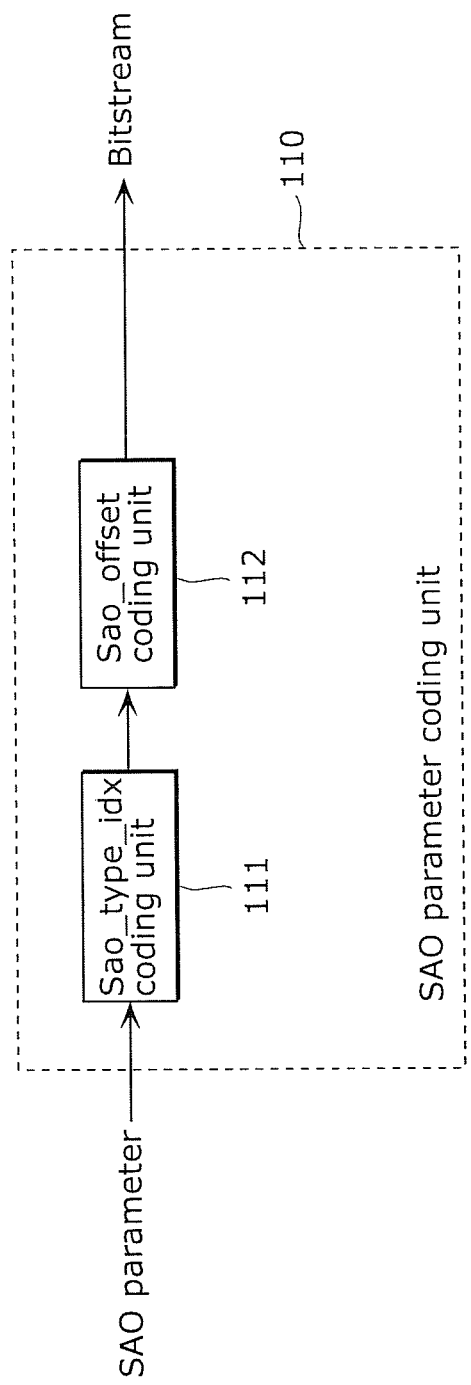
FIG. 2 is a block diagram illustrating an example configuration of an SAO parameter coding unit.

FIG. 2 is a block diagram illustrating an example configuration of the SAO parameter coding unit 110. As illustrated in FIG. 2, the SAO parameter coding unit 110 includes an sao_type_idx coding unit 111 and an sao_offset coding unit 112.

The sao_type_idx coding unit 111 performs arithmetic coding on sao_type_idx indicating a category of sao_offset. Here, sao_offset is classified into two categories: an edge offset value determined according to a status of surrounding pixels; and a band offset value determined according to a region to which the pixel value of a pixel belongs.

Figure 3:
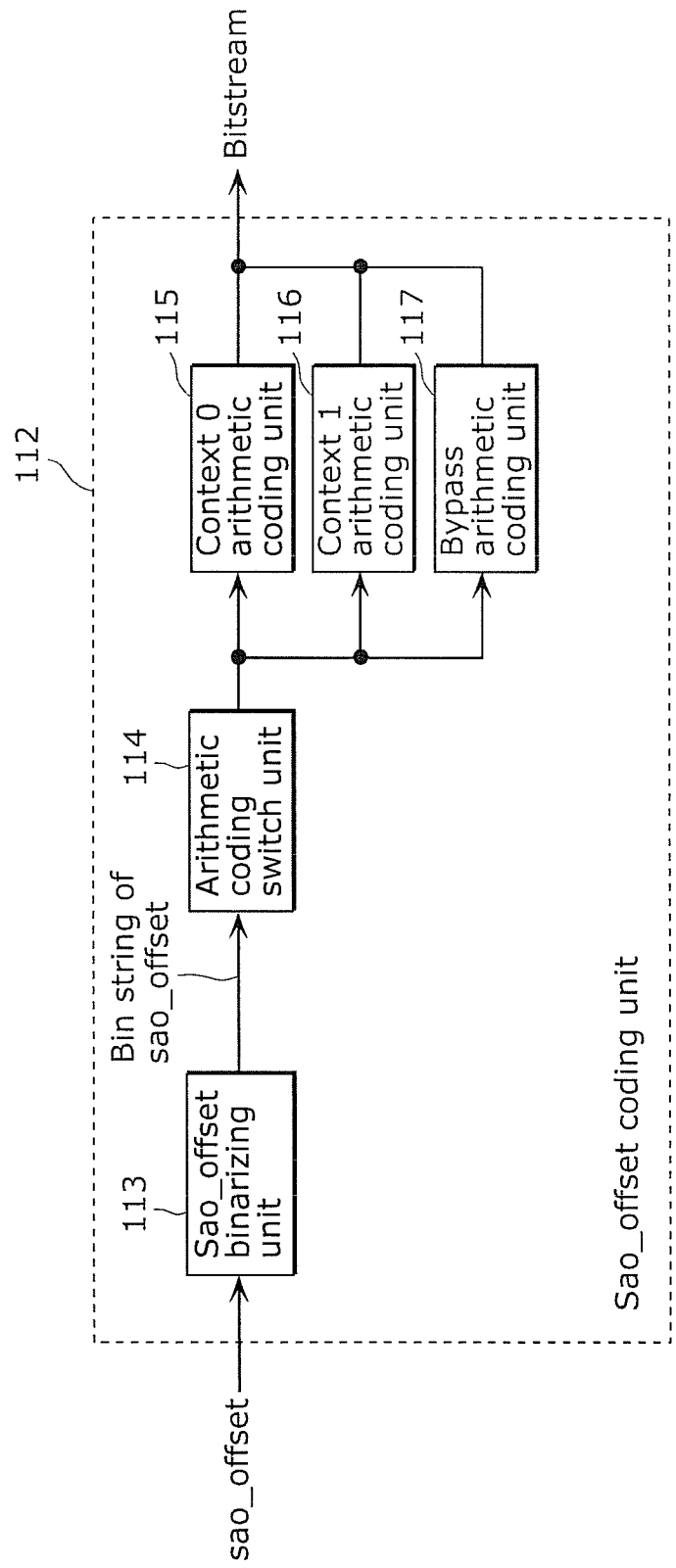
FIG. 3 is a block diagram illustrating an example configuration of an sao_offset coding unit.

The sao_offset coding unit 112 performs arithmetic coding on sao_offset. FIG. 3 is a block diagram illustrating an example configuration of the sao_offset coding unit 112.

As illustrated in FIG. 3, the sao_offset coding unit 112 includes an sao_offset binarizing unit 113, an arithmetic coding switch unit 114, a context 0 arithmetic coding unit 115, a context 1 arithmetic coding unit 116, and a bypass arithmetic coding unit 117.

The sao_offset binarizing unit 113 binarizes sao_offset that is a non-binary signal (converts sao_offset into a signal representing 0 and 1). The arithmetic coding switch unit 114 switches a method of the arithmetic coding to be applied to sao_offset. The context 0 arithmetic coding unit 115 performs context 0 arithmetic coding using a first context (context 0). The context 1 arithmetic coding unit 116 performs context 1 arithmetic coding using a second context (context 1). The bypass arithmetic coding unit 117 performs bypass arithmetic coding using a fixed probability.

The frame memory 108 includes a memory, such as a Random Access Memory (RAM) and a Read Only Memory (ROM).

The prediction unit 109 generates a prediction block through inter prediction or intra prediction. In inter prediction, the prediction unit 109 derives a motion vector using a block to be predicted, and generates a prediction block, using the derived motion vector and the reconstructed block obtained in the SAO process and stored in the frame memory 108. In intra prediction, the prediction unit 109 generates a prediction block using the reconstructed block obtained in the SAO process and stored in the frame memory 108, according to a prediction mode.

<1-2 Overall Operations>

Figure 4:
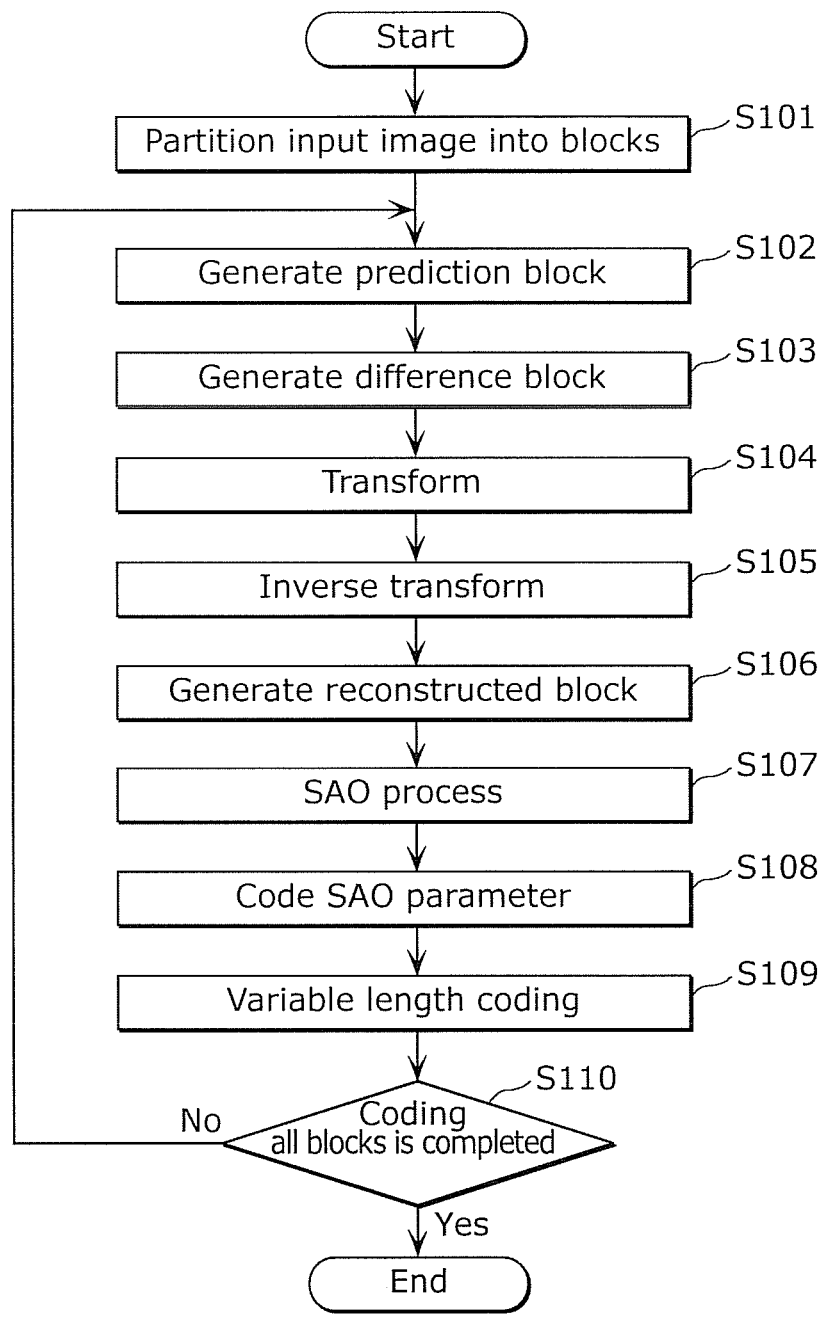
FIG. 4 is a flowchart indicating example processes of the image coding apparatus according to Embodiment 1.

Next, the operations of the image coding apparatus will be described with reference to FIG. 4. FIG. 4 is a flowchart indicating the procedure of the image coding apparatus 100.

In the image coding apparatus 100, the block partitioning unit 101 first partitions an input image into blocks to be predicted, and successively outputs the blocks to the subtracting unit 102 and the prediction unit 109 (S101). The blocks to be predicted are variable in size according to Embodiment 1. The input image is partitioned using features of the image. The minimum size of the blocks to be predicted is horizontal 4 pixels×vertical 4 pixels according to Embodiment 1. Furthermore, the maximum size of the blocks to be predicted is horizontal 32 pixels×vertical 32 pixels according to Embodiment 1.

The prediction unit 109 of the image coding apparatus 100 generates a prediction block using the blocks to be predicted and the reconstructed block stored in the frame memory 108 (S102).

The subtracting unit 102 of the image coding apparatus 100 subtracts a prediction block from each of the blocks to be predicted to generate a difference block (S103).

The transform unit 103 of the image coding apparatus 100 transforms the difference block into frequency coefficients, and transforms the frequency coefficients into quantized coefficients (S104).

The inverse transform unit 105 of the image coding apparatus 100 inversely quantizes the quantized coefficients to derive the frequency coefficients, and transforms the frequency coefficients from the frequency domain to the image domain to generate a reconstructed difference block (S105).

The adding unit 106 of the image coding apparatus 100 adds the prediction block to the reconstructed difference block to generate a reconstructed block (S106).

The SAO processing unit 107 of the image coding apparatus 100 performs an SAO process (S107). The SAO processing unit 107 first determines SAO parameters to be used for the SAO process. In Embodiment 1, the SAO parameters are sao_offset indicating an SAO offset value and sao_type_idx indicating a category of the SAO offset value. The SAO processing unit 107 adds the SAO offset value to the pixel value of each pixel included in the reconstructed block, and stores the reconstructed block to which the SAO offset values are added, in the frame memory 108. In the SAO process, each of the pixels included in the reconstructed block is classified in categories, and an SAO offset value is derived for each of the categories. Methods for classifying the pixels are multiple. Thus, a parameter of sao_type_idx indicating a category of the SAO offset value is used.

The SAO parameter coding unit 110 of the image coding apparatus 100 performs variable length coding on the SAO parameter, and adds the parameter to the bitstream output from the variable length coding unit 104 (S108). The details of the SAO parameter coding unit 110 will be described later.

The variable length coding unit 104 of the image coding apparatus 100 performs variable length coding on the quantized coefficients output from the transform unit 103 to output a bitstream (S109).

The image coding apparatus 100 repeatedly performs Steps S102 to S109 until coding of all the blocks to be predicted of the input image is completed (S110).

<1-2-1. Operations of the SAO Parameter Coding Unit>

The operations of the SAO parameter coding unit 110 according to Embodiment 1 will be described with reference to FIG. 5.

Figure 5:
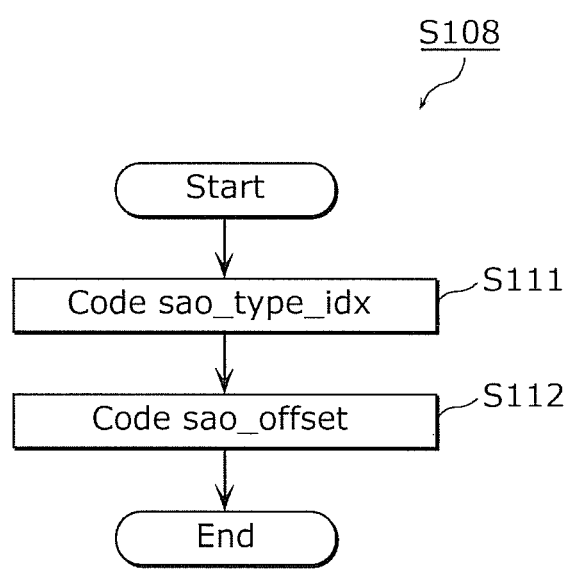
FIG. 5 is a flowchart indicating example processes of the SAO parameter coding unit according to Embodiment 1.

FIG. 5 is a flowchart indicating example processes of the SAO parameter coding unit 110, and details Step S108 of FIG. 4.

The sao_type_idx coding unit 111 of the SAO parameter coding unit 110 codes sao_type_idx (S111).

The sao_offset coding unit 112 of the SAO parameter coding unit 110 codes sao_offset (S112).

<1-2-2. Operations of the sao_offset Coding Unit>

Figure 6A:
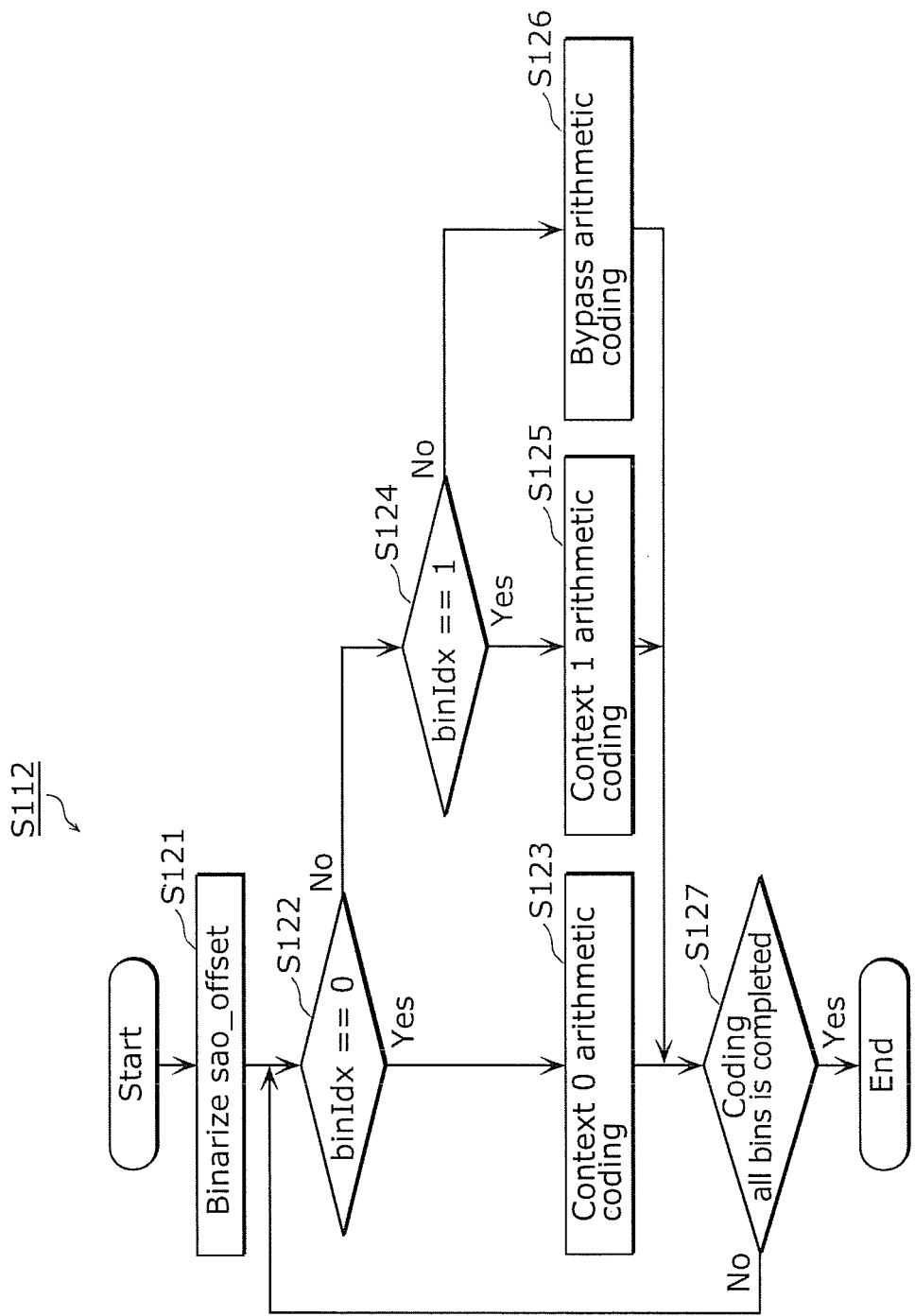
FIG. 6A is a flowchart indicating example processes of the sao_offset coding unit according to Embodiment 1.

The operations of the sao_offset coding unit 112 according to Embodiment 1 will be described with reference to FIG. 6A. FIG. 6A is a flowchart indicating example processes of the sao_offset coding unit 112.

The sao_offset binarizing unit 113 of the sao_offset coding unit 112 converts sao_offset from a non-binary signal to a bin string (S121). Embodiment 1 describes a case where sao_offset takes values from 0 to 7. FIG. 7 is a table indicating a correspondence between the non-binary signals and the bin strings. As seen from FIG. 7, the number of consecutive "1"s from the beginning of each bin string is equal to the value indicated by the non-binary signal. Furthermore, "0" is added to the last when the non-binary signal is between 0 and 6. When the non-binary signal is 7 that is the maximum number, no "0" is added to the last. Here, the binIdx is an index of a bin (one bit) included in a bin string. The first value of a binIdx is 0, and the subsequent values are incremented by 1. The bin string is output to the arithmetic coding switch unit 114 sequentially from the bin whose binIdx is 0.

The arithmetic coding switch unit 114 of the sao_offset coding unit 112 determines a value of a binIdx (S122, S124, and S126).

When the value is 0 (Yes at S122), the arithmetic coding switch unit 114 outputs the bin to the context 0 arithmetic coding unit 115. The context 0 arithmetic coding unit 115 performs context arithmetic coding using the context 0 (S123).

When the value is 1 (No at S122 and Yes at S124), the arithmetic coding switch unit 114 outputs the bin to the context 1 arithmetic coding unit 116. The context 1 arithmetic coding unit 116 performs context arithmetic coding using the context 1 (S125).

When the value is neither 0 nor 1 (No at S122 and No at S124), the arithmetic coding switch unit 114 outputs the bin to the bypass arithmetic coding unit 117. The bypass arithmetic coding unit 117 performs bypass arithmetic coding (S126).

Since the bypass arithmetic coding unit 117 does not use any context, the sao_offset coding unit 112 overall uses two types of contexts according to Embodiment 1.

The sao_offset coding unit 112 repeats the processes from Step 122 to Step 127 until processing on all the bins included in the bin string is completed (S127).

<1-3. Advantages, Variations, Etc.>

The image coding apparatus 100 according to Embodiment 1 can accelerate processing by performing bypass performs arithmetic coding on bins in a latter half of sao_offset. More specifically, not the context arithmetic coding but the bypass performs arithmetic coding is performed on bins whose binIdx is 2 or higher according to Embodiment 1. As described above, the bypass arithmetic coding does not require loading and updating any context. Thus, arithmetic coding on an SAO offset value of a block to be predicted can be started without waiting for completion of the arithmetic coding on another SAO offset value, and the processing can be accelerated.

Furthermore, symbol occurrence probabilities (probabilities of occurrence of 1) of binIdxs 1 to 6 in accordance with the HEVC standard (NPTL 1) that is currently being studied are almost the same, but are not equal to 50% and have a bias. In other words, with presence of the binIdxs after binIdx1 (when sao_offset is 1 or higher), cases are often divided into a case where binIdx1 is 0 without any binIdx2 and after (sao_offset is 1), and a case where the binIdxs 1 to 6 are all 1 (sao_offset is 7).

However, the Inventors have found that as a result of the experiment for coding the binIdxs 1 to 6 with a fixed symbol occurrence probability of 50%, the coding efficiency is hardly degraded. Specifically, it revealed that sao_offset often indicates a medium value (2 to 6) and the symbol occurrence probabilities of the binIdxs 1 to 6 are closer to 50%. Thus, processing for suppressing decrease in the coding efficiency can be accelerated using not the context arithmetic coding but the bypass arithmetic coding on the binIdxs after binIdx2.

<1-3-1. Variations>

Although the bypass arithmetic coding is performed on the bins after binIdx2 according to Embodiment 1, the processing is not limited to such.

FIG. 8 is a table indicating a correspondence between bins included in a binIdx and the arithmetic coding to be applied. In FIG. 8, "Embodiment 1" indicates a correspondence between the bins described in Embodiment 1 and the arithmetic coding to be applied. Furthermore, "Context 0" indicates the context arithmetic coding using the context 0. "Context 1" indicates the context arithmetic coding using the context 1. "Bypass" indicates the bypass arithmetic coding.

"Change 1" in FIG. 8 indicates Variation 1. According to Variation 1, the context arithmetic coding is performed on the bin of binIdx0, and the bypass arithmetic coding is performed on the bins after binIdx1. Furthermore, the sao_offset coding unit 112 in FIG. 2 has only to include the sao_offset binarizing unit 113, the arithmetic coding switch unit 114, the context 0 arithmetic coding unit 115, and the bypass arithmetic coding unit 117 according to Variation 1. In other words, the sao_offset coding unit 112 does not have to include the context 1 arithmetic coding unit 116.

"Change 2" in FIG. 8 indicates Variation 2. In Variation 2, the bypass arithmetic coding is performed on each of the bins of the binIdxs as shown in FIG. 8.

Figure 6B:
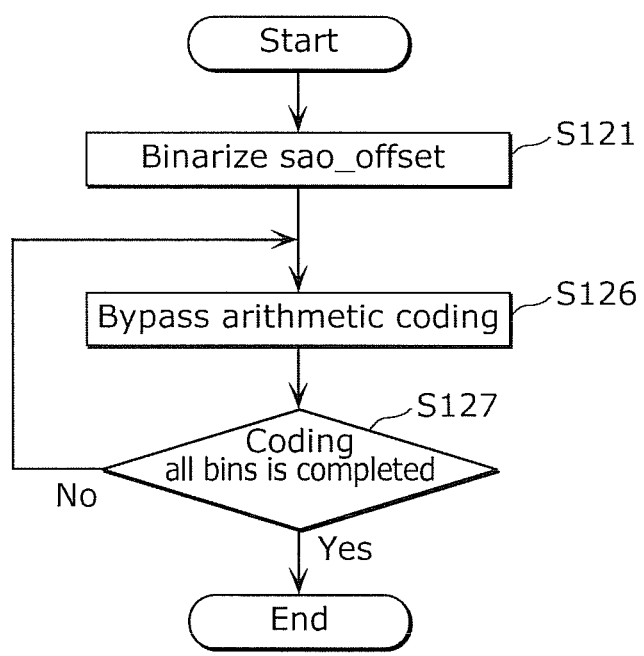
FIG. 6B is a flowchart indicating example processes of the sao_offset coding unit according to Variation 2 of Embodiment 1.

FIG. 6B is a flowchart indicating example processes (image coding method) of the sao_offset coding unit 112 according to Variation 2. In FIG. 6B, sao_offset is binarized (S121 for converting an offset value to a bin string), and the bypass arithmetic coding is performed on all the bins included in sao_offset (S126 and S127 for performing the bypass arithmetic coding). Since the bypass arithmetic coding is performed on all the bins, the processing can be the fastest in Variation 2.

Furthermore, the sao_offset coding unit 112 in FIG. 2 has only to include the sao_offset binarizing unit 113 and the bypass arithmetic coding unit 117 according to Variation 2. In other words, the sao_offset coding unit 112 does not have to include the context 0 arithmetic coding unit 115 and the context 1 arithmetic coding unit 116.

Although not illustrated, it is acceptable to perform the context arithmetic coding on binIdxs 0 to 2, and the bypass arithmetic coding on binIdxs after binIdx3.

<1-3-2. Result of Experiment on Coding Efficiency>

FIG. 9 is a table showing the result of experiment on the coding efficiency according to Embodiment 1 and Variation 1.

FIG. 9 shows the result of comparison between the coding efficiency obtained by performing arithmetic coding on an SAO offset value in accordance with the current HEVC standard (NPL 1) and the coding efficiency according to Embodiment 1 and Variation 1. The experiment conditions follow the common experiment conditions of the HEVC standard organization.

The larger the value is, the lower the coding efficiency is. The negative value indicates improvement in the coding efficiency.

As shown in "Embodiment 1" of FIG. 9, values indicating the result of comparison ranges between −0.1% and 0.1%. This indicates that the coding efficiency for coding binIdx2 to binIdx6 of the SAO offset value is almost the same between the context arithmetic coding and the bypass arithmetic coding.

Although the coding efficiency of Variation 1 is lower than that of Embodiment 1 as seen from "Change 1" in FIG. 9, the results range between 0 and 0.1% and the coding efficiency is almost the same.

Although the coding efficiency of Variation 2 is also lower than that of Embodiment 1 as seen from "Change 2" in FIG. 9, the results range between 0 and 0.1% and the coding efficiency is almost the same.

As a result of the experiment on coding efficiency, application of the bypass arithmetic coding in performing arithmetic coding on an SAO offset value enables acceleration of the arithmetic coding while the coding efficiency is less likely to be lowered.

(Embodiment 2)

An image decoding apparatus and an image decoding method according to Embodiment 2 will be described with reference to FIGS. 10 to 15A.

<2-1. Configuration of Apparatus>

Figure 10:
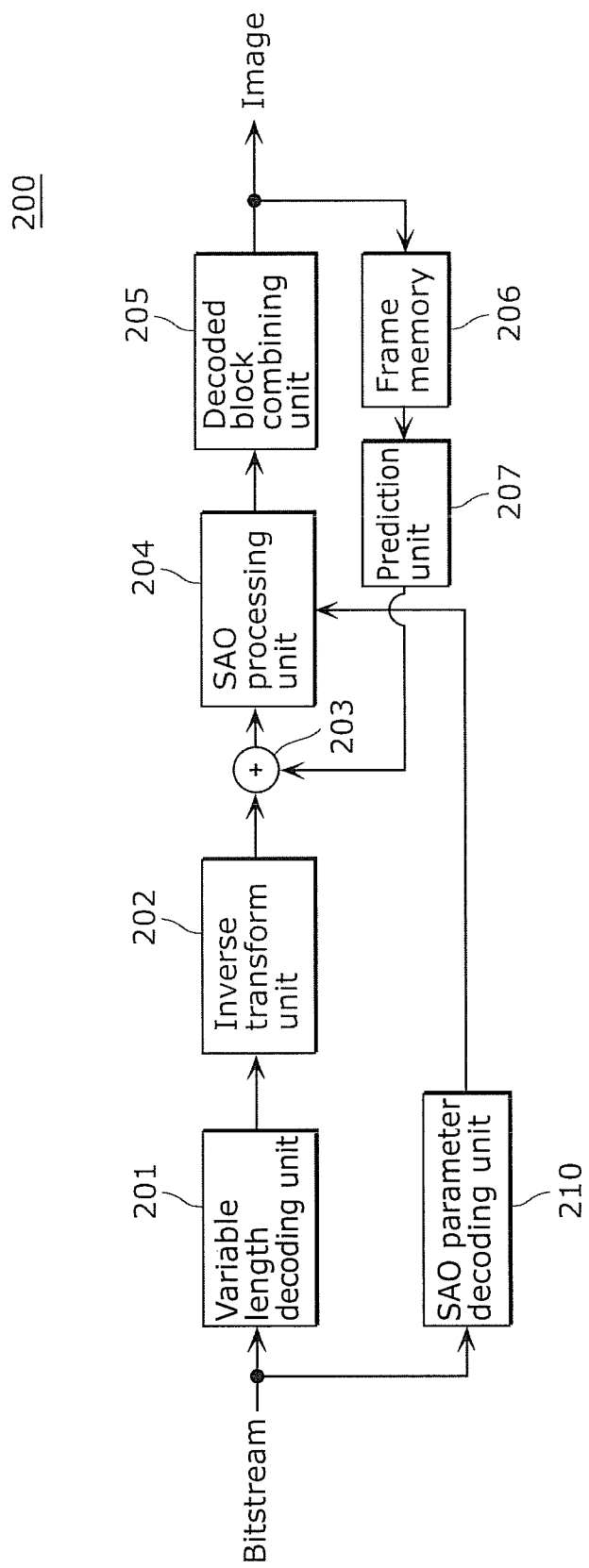
FIG. 10 is a block diagram illustrating an example configuration of an image decoding apparatus according to Embodiment 2.

The image decoding apparatus according to Embodiment 2 will be described with reference to FIG. 10. FIG. 10 is a block diagram illustrating a configuration of an image decoding apparatus 200 in accordance with the HEVC standard according to Embodiment 2.

The image decoding apparatus 200 is an apparatus that decodes an input bitstream (coded bitstream) to generate a decoded image ("Image" in FIG. 10).

As illustrated in FIG. 10, the image decoding apparatus 200 includes a variable length decoding unit 201, an inverse transform unit 202, an SAO parameter decoding unit 210, an SAO processing unit 204, a decoded block combining unit 205, a frame memory 206, and a prediction unit 207.

The variable length decoding unit 201 performs entropy decoding (variable length decoding) on the bitstream input to the image decoding apparatus 200 to obtain the quantized coefficients and various information necessary for decoding (partitioning information for the blocks to be predicted, a type of prediction, a motion vector, a prediction mode (intra prediction mode), a quantized parameter, etc).

The inverse transform unit 202 performs inverse quantization for transforming the quantized coefficients output from the variable length decoding unit 201 into frequency coefficients, and performs inverse transform for transforming the frequency coefficients from the frequency domain to the image domain to derive a difference block.

The adding unit 203 adds the prediction block output from the prediction unit 207 to the difference block output from the inverse transform unit 202 to generate a decoded block.

The SAO parameter decoding unit 210 decodes various parameters to be used in the SAO process from the bitstream. Embodiment 2 exemplifies sao_offset indicating an SAO offset value and sao_type_idx indicating a category of the SAO offset value, as SAO parameters.

Figure 11:
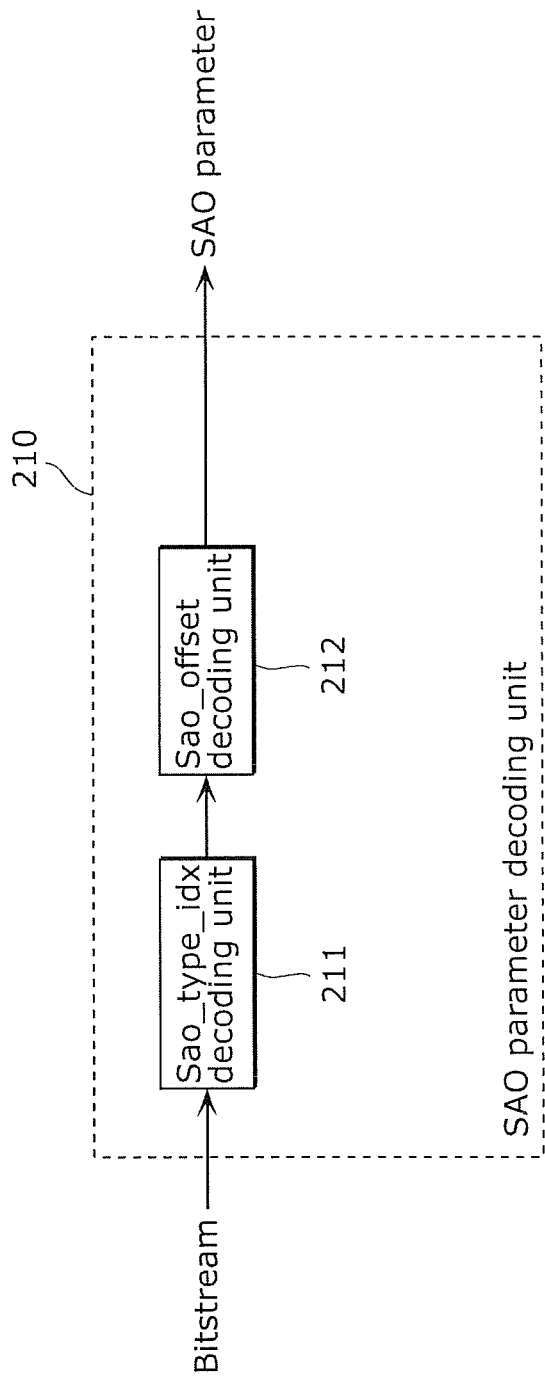
FIG. 11 is a block diagram illustrating an example configuration of an SAO parameter decoding unit.

FIG. 11 is a block diagram illustrating an example configuration of the SAO parameter decoding unit 210. As illustrated in FIG. 11, the SAO parameter decoding unit 210 includes an sao_type_idx decoding unit 211 that performs arithmetic decoding on sao_type_idx, and an sao_offset decoding unit 212 that performs arithmetic decoding on sao_offset.

Figure 12:
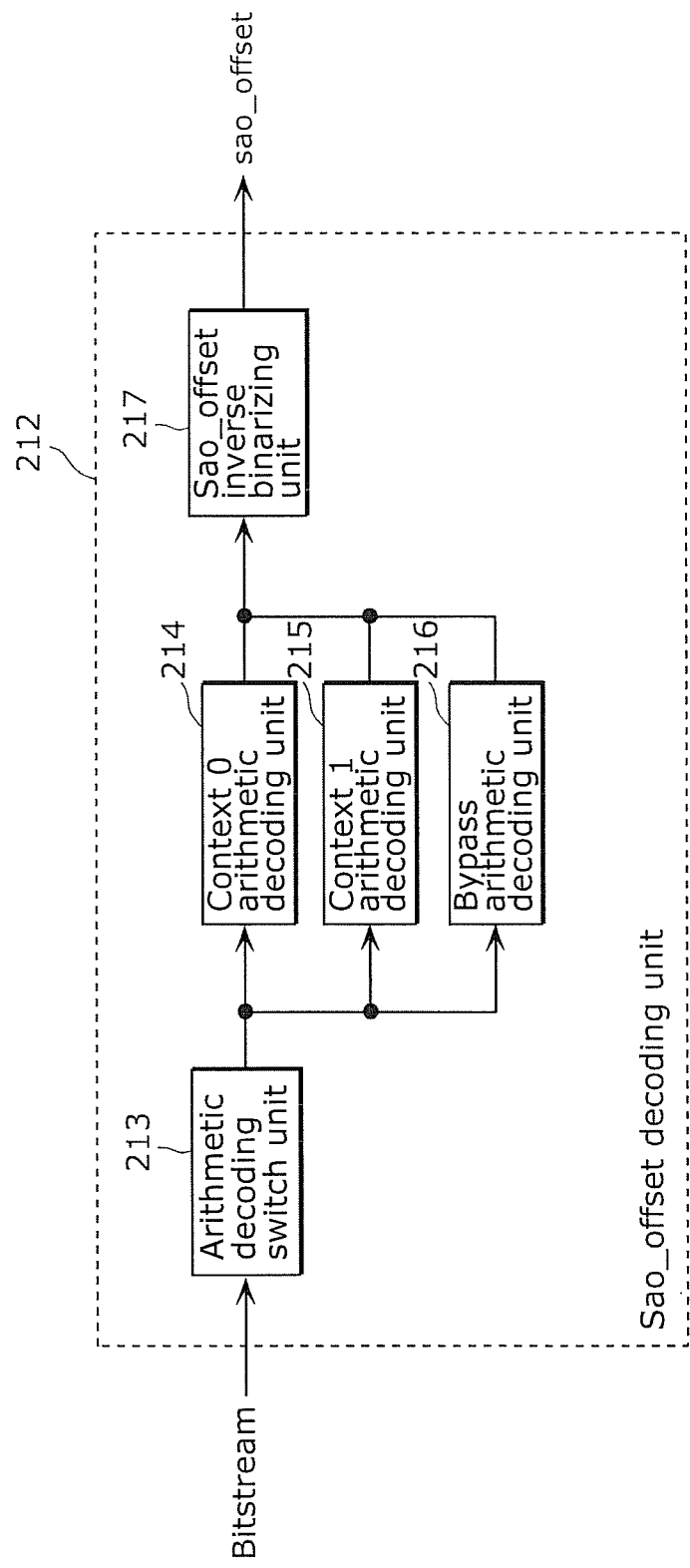
FIG. 12 is a block diagram illustrating an example configuration of an sao_offset decoding unit.

FIG. 12 is a block diagram illustrating an example configuration of the sao_offset decoding unit 212. As illustrated in FIG. 12, the sao_offset decoding unit 212 includes an arithmetic decoding switch unit 213, a context 0 arithmetic decoding unit 214, a context 1 arithmetic decoding unit 215, a bypass arithmetic decoding unit 216, and an sao_offset inverse binarizing unit 217.

The arithmetic decoding switch unit 213 switches a method of the arithmetic decoding to be applied to a bitstream. The context 0 arithmetic decoding unit 214 performs context 0 arithmetic decoding using a first context (context 0). The context 1 arithmetic decoding unit 215 performs context 1 arithmetic decoding using a second context (context 1). The bypass arithmetic decoding unit 216 performs bypass arithmetic decoding using a fixed probability. The sao_offset inverse binarizing unit 217 inversely binarizes the bin string of sao_offset output from each of the context 0 arithmetic decoding unit 214, the context 1 arithmetic decoding unit 215, the bypass arithmetic decoding unit 216 to derive a non-binary value of sao_offset.

The SAO processing unit 204 performs the SAO process (offset process) on the decoded block output from the adding unit 203 for adding an SAO offset value to a pixel value of each pixel included in the decoded block, which will be described in detail later.

The decoded block combining unit 205 combines the decoded blocks obtained in the SAO process to reconstruct the decoded image. Furthermore, the decoded block combining unit 205 stores the decoded image in the frame memory 206.

The frame memory 206 includes a memory, such as a Random Access Memory (RAM) and a Read Only Memory (ROM).

The prediction unit 207 generates a prediction block through inter prediction or intra prediction. The prediction method to be applied by the prediction unit 207 is the same as that of the prediction unit 109.

<2-2 Overall Operations>

Figure 13:
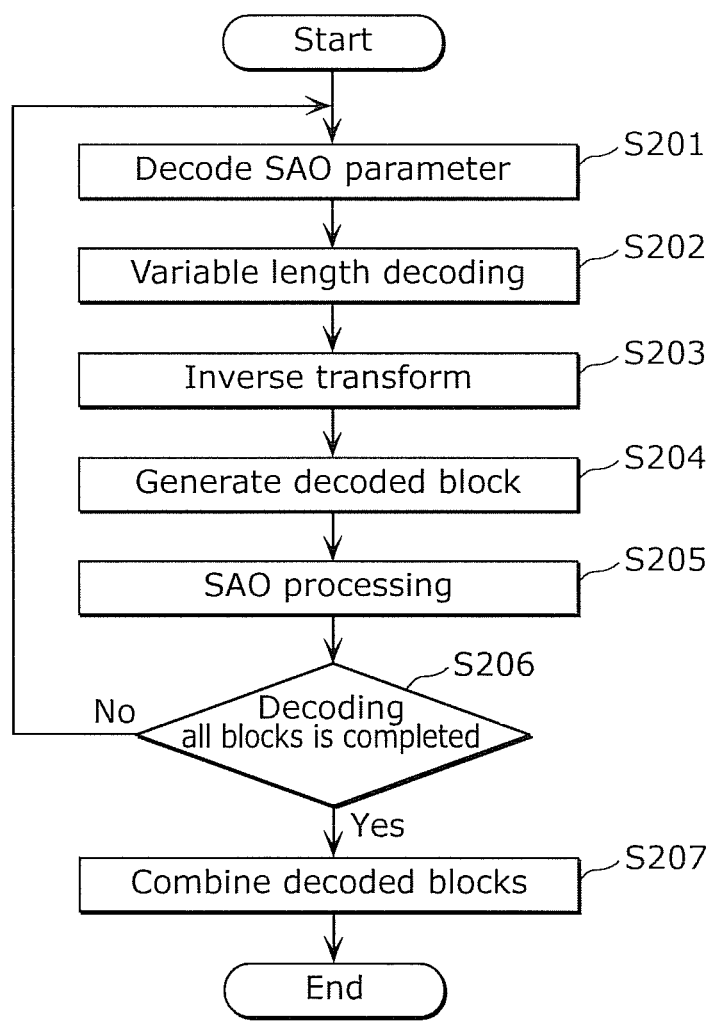
FIG. 13 is a flowchart indicating example processes of the image decoding apparatus according to Embodiment 2.

Next, the operations of the image decoding apparatus 200 will be described with reference to FIG. 13. FIG. 13 is a flowchart indicating the procedure of the image decoding apparatus 200.

The SAO parameter decoding unit 210 of the image decoding apparatus 200 performs variable length decoding on an SAO parameter (S201).

The variable length decoding unit 201 of the image decoding apparatus 200 performs variable length decoding on a bitstream to obtain quantized coefficients, and outputs the quantized coefficients to the inverse transform unit 202 (S202).

The inverse transform unit 202 of the image decoding apparatus 200 performs inverse quantization on the quantized coefficients to obtain frequency coefficients, and performs inverse transform on the obtained frequency coefficients to generate a difference block (S203).

The prediction unit 207 of the image decoding apparatus 200 generates a prediction block from the decoded image stored in the frame memory 206. Furthermore, the adding unit 203 of the image decoding apparatus 200 adds the prediction block output from the prediction unit 207 to the difference block output from the inverse transform unit 202 to generate a decoded block (S204).

The SAO processing unit 204 of the image decoding apparatus 200 performs an SAO process (S205). In the SAO process, the SAO processing unit 204 classifies each pixel of the decoded block in categories according to the SAO parameter, and adds an offset value corresponding to each of the categories to the pixel. The SAO parameters include a parameter of sao_type_idx indicating a category, and a parameter of sao_offset indicating an offset value.

The image decoding apparatus 200 repeats the processes from Step 201 to Step 205, until decoding all the blocks included in the coded image is completed (S206).

The decoded block combining unit 205 of the image decoding apparatus 200 combines the decoded blocks to generate a decoded image, and stores the decoded image in the frame memory 206.

<2-2-1. Operations of the SAO Parameter Variable Length Decoding Unit>

The operations of the SAO parameter decoding unit 210 according to Embodiment 2 will be described with reference to FIG. 14.

Figure 14:
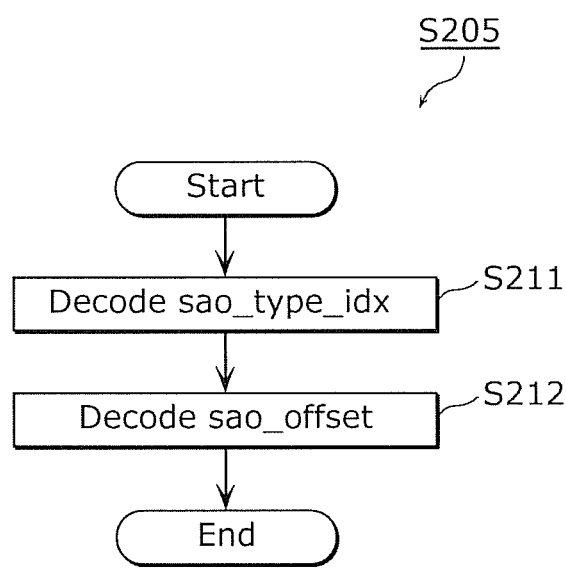
FIG. 14 is a flowchart indicating example processes of the SAO parameter decoding unit according to Embodiment 2.

FIG. 14 is a flowchart indicating example processes of the SAO parameter decoding unit 210, and details Step S205 of FIG. 13.

The sao_type_idx decoding unit 211 of the SAO parameter decoding unit 210 decodes sao_type_idx (S211).

The sao_offset decoding unit 212 of the SAO parameter decoding unit 210 decodes sao_offset (S212).

<2-2-2. Operations of the sao_offset Decoding Unit 212>

Figure 15A:
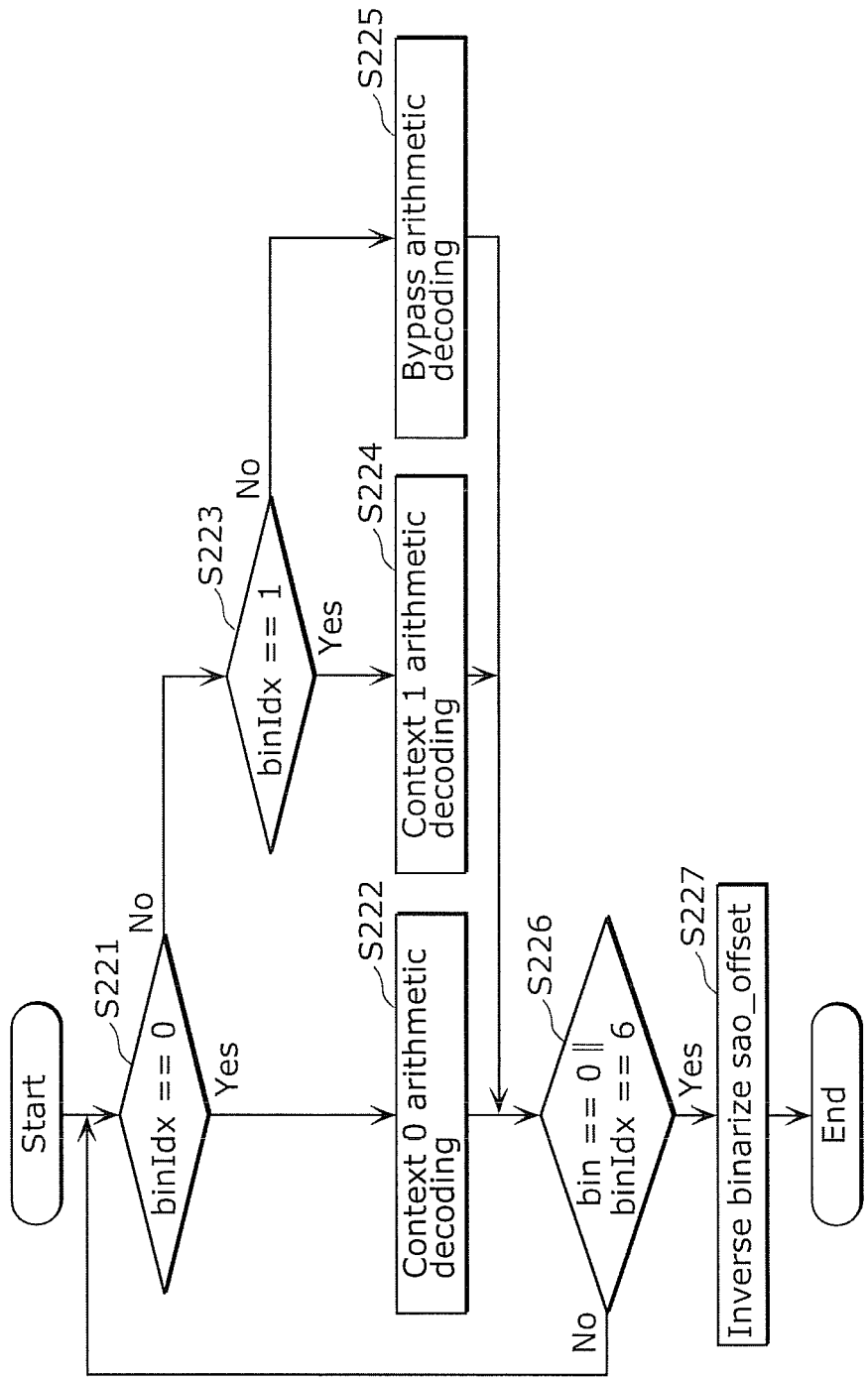
FIG. 15A is a flowchart indicating example processes of the sao_offset decoding unit according to Embodiment 2.

The operations of the sao_offset decoding unit 212 according to Embodiment 2 will be described with reference to FIG. 15A. FIG. 15A is a flowchart indicating example processes of the sao_offset decoding unit 212.

The arithmetic decoding switch unit 213 of the sao_offset decoding unit 212 determines a value of a binIdx of a bin to be decoded (S221, S223, and S225).

When the value is 0 (Yes at S221), the arithmetic decoding switch unit 213 outputs the bin to be decoded to the context 0 arithmetic decoding unit 214. The context 0 arithmetic decoding unit 214 performs context arithmetic decoding using the context 0 (S222).

When the value is 1 (No at S221 and Yes at S223), the arithmetic decoding switch unit 213 outputs the bin to be decoded to the context 1 arithmetic decoding unit 215. The context 1 arithmetic decoding unit 215 performs context arithmetic decoding using the context 1 (S224).

When the value is neither 0 nor 1 (No at S221 and No at S223), the arithmetic decoding switch unit 213 outputs the bin to be decoded to the bypass arithmetic decoding unit 216. The bypass arithmetic decoding unit 216 performs bypass arithmetic coding.

The sao_offset decoding unit 212 repeats the processes from Step 221 to Step 226 until the value of the bin obtained in the arithmetic decoding is equal to 0 or a bin whose binIdx is 6 is decoded (S226).

The sao_offset decoding unit 212 converts the bin string including bins decoded by the sao_offset inverse binarizing unit 217 into a non-binary signal (S227). The correspondence between the non-binary signals and the bin strings is the same as shown in FIG. 7 according to Embodiment 1.

<2-3. Advantages, Etc.>

The image decoding apparatus 200 according to Embodiment 2 can accelerate processing by performing bypass arithmetic decoding on bins in a latter half of sao_offset.

<2-3-1. Variations>

Although the bypass arithmetic decoding is performed on the bins after binIdx2 according to Embodiment 2, the processing is not limited to such. In the same manner as Embodiment 1, the bypass arithmetic decoding may be performed on the bins after binIdx1 (Variation 1), and on all the bins (Variation 2).

In Variation 1 according to Embodiment 2, the context arithmetic decoding is performed on the bin of binIdx0, and the bypass arithmetic decoding is performed on bins after binIdx1. This process is a decoding process corresponding to the coding process of Variation 1 of Embodiment 1 in FIG. 8. Since the sao_offset decoding unit 212 in FIG. 12 according to Variation 1 performs bypass arithmetic decoding on the bins after binIdx1, it has only to include the arithmetic decoding switch unit 213, the context 0 arithmetic decoding unit 214, the bypass arithmetic decoding unit 216, and the sao_offset inverse binarizing unit 217. In other words, the sao_offset decoding unit 212 according to Variation 1 of Embodiment 2 does not have to include the context 1 arithmetic decoding unit 215.

According to Variation 2 of Embodiment 2, the sao_offset decoding unit 212 performs the bypass arithmetic decoding on each of the bins of the binIdx. This process is a decoding process corresponding to the coding process of Variation 2 of Embodiment 1 in FIG. 8.

Figure 15B:
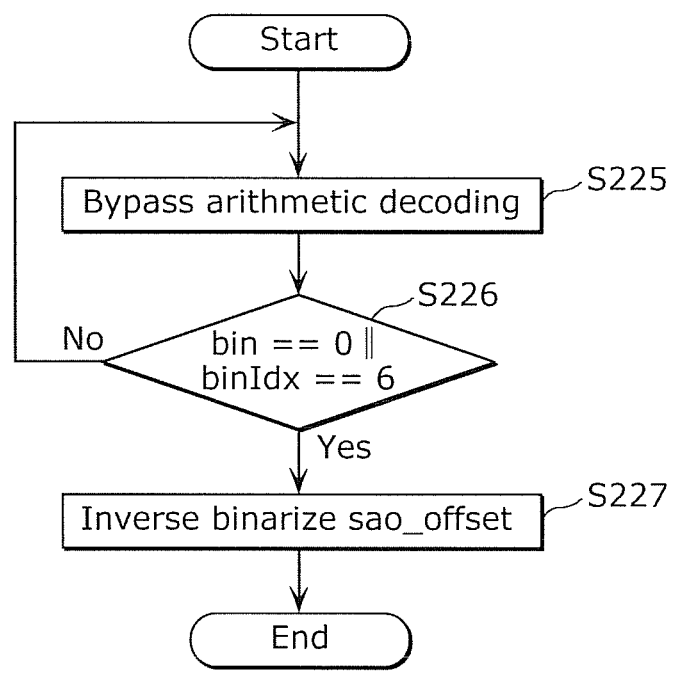
FIG. 15B is a flowchart indicating example processes of the sao_offset decoding unit according to Variation 2 of Embodiment

FIG. 15B is a flowchart indicating example processes (image decoding method) of the sao_offset decoding unit 212 according to Variation 2 of Embodiment 2. In FIG. 15B, the bypass arithmetic decoding is performed on all the bins included in sao_offset (S225 and S226 for performing the bypass arithmetic decoding), and the decoded sao_offset is inversely binarized (S227 for converting a bin string into an offset value). Since the bypass arithmetic decoding is performed on all the bins, the processing can be the fastest in Variation 2.

Since the sao_offset decoding unit 212 in FIG. 12 according to Variation 2 herein performs bypass arithmetic decoding on all the bins, it has only to include the bypass arithmetic decoding unit 216 and the sao_offset inverse binarizing unit 217. In other words, the sao_offset decoding unit 212 according to Variation 2 of Embodiment 2 does not have to include the arithmetic decoding switch unit 213, the context 0 arithmetic decoding unit 214, and the context 1 arithmetic decoding unit 215.

Although not illustrated, it is acceptable to perform the context arithmetic decoding on binIdxs 0 to 2, and the bypass arithmetic decoding on binIdxs after binIdx3 as according to Embodiment 1.

(Other Variations of Embodiments 1 and 2)

(1) Although Embodiments 1 and 2 (including Variations) use sao_type_idx indicating a category of an SAO offset value and sao_offset indicating the SAO offset value as SAO parameters, the SAO parameters are not limited to such. The SAO parameters may include, for example, a parameter to be auxiliary information for classifying pixels.

(2) Furthermore, although the SAO parameter is coded per block to be predicted according to Embodiment 1 (including Variations), the coding is not limited to such. The SAO parameter may be coded not per block to be predicted but on a per unit smaller than the block to be predicted, or conversely on a per unit obtained by concatenating blocks to be predicted. Furthermore, the SAO parameter is not coded in the block to be predicted, but instead, a value of another block may be copied and used.

Here, the image decoding apparatus 200 according to Embodiment 2 (including Variations) decodes the coded SAO parameter according to the coding size of the SAO parameter in the image coding apparatus 100.

(3) Although sao_offset takes values from 0 to 7 according to Embodiments 1 and 2 (including Variations), sao_offset is not limited to such. It may take values 8 or higher. Furthermore, sao_offset may take a negative value, and in such a case, another parameter sao_offset_sign representing a sign bit may be provided.

(4) Furthermore, although Embodiment 1 (including Variations) describes coding sao_offset, the processing is not limited to such. The method for coding an SAO parameter according to Embodiment 1 (including Variations) may be applied to coding another syntax to be added to a bitstream. Furthermore, when the method for coding the SAO parameter according to Embodiment 1 and its Variation 1 is applied to coding syntaxes and the use of context (the number of bins and binIdxs that use context) is unified, the same variable length coding unit is available in coding the syntaxes. Accordingly, the configuration of the apparatus can be simplified.

Examples of the syntaxes to which the method for coding the SAO parameter according to Embodiment 1 and its Variations 1 and 2is applied include ref_idx indicating an index of a reference image, merge_idx indicating a copy source of a motion vector and others, and mpm_idx or intra_chroma_pred_mode indicating an intra prediction mode, in accordance with the current HEVC standard (NPL 1).

Here, the image decoding apparatus 200 according to Embodiment 2 (including Variations) also decodes a syntax coded using the method for coding the SAO parameter, using the method for decoding the SAO parameter.

(5) Furthermore, although the size of the block to be predicted according to Embodiments 1 and 2 (including Variations) is 32×32 pixels at a maximum and 4×4 pixels at a minimum, the size is not limited to such. Furthermore, although Embodiments 1 and 2 (including Variations) describe the blocks to be predicted that are variable in size, the size of the blocks may be fixed.

(6) Furthermore, the processing according to Embodiments 1 and 2 (including Variations) may be implemented by software. The software may be distributed through, for example, downloading. Furthermore, the software may be distributed by recording it on recording media, such as CD-ROMs. This holds true for the other Embodiments in the Description.

(7) In Embodiments 1 and 2 (including Variations), each of the functional blocks may be generally implemented by, for example, an MPU and a memory. Furthermore, in general, the processing by each of the functional blocks may be implemented by software (a program), and such software is recorded on a recording medium such as a ROM. In addition, such software may be distributed by, for example, downloading, and recording it on recording media such as CD-ROMs. Each of the functional blocks may be implemented by hardware (a dedicated circuit).

(8) The processing described in Embodiments 1 and 2 (including Variations) may be performed as centralized processing by a single apparatus (system) or as decentralized processing by a plurality of apparatuses. Here, the program may be executed by one or more computers. In other words, any one of the centralized processing and the decentralized processing may be performed.

(9) Furthermore, each of the constituent elements according to Embodiments 1 and 2 (including Variations) may be implemented by dedicated hardware or by executing a software program appropriate for the constituent element. Each of the constituent elements may be implemented by a program executing unit, such as a central processing unit (CPU) and a processor, reading and executing the software program recorded on a recording medium, such as a hard disk or a semiconductor memory.

Specifically, each of the image coding apparatus 100 and the image decoding apparatus 200 includes a control circuit and storage electrically connected to (capable of accessing from) the control circuit. The control circuit includes at least one of the dedicated hardware and the program executing unit. When the control circuit includes the program executing unit, the storage stores the software program executed by the program executing unit.

The present disclosure is not limited to Embodiments 1 and 2 (including Variations), and various modifications are possible and are included in the scope of the present disclosure.

(Embodiment 3)

An independent computer system can easily perform processing described in each of Embodiments by recording, in a recording medium, a program for implementing the structure of the moving picture coding method (image coding method) or the moving picture decoding method (image decoding method) according to Embodiment. The recording medium may be any as long as the program can be recorded thereon, such as a magnetic disk, an optical disk, an optical magnetic disk, an IC card, and a semiconductor memory.

Hereinafter, applications of the moving picture coding method (image coding method) and the moving picture decoding method (image decoding method) according to each of Embodiments, and a system using such applications will be described. The system features including an image coding apparatus using the image coding method, and an image coding and decoding apparatus including an image decoding apparatus using the image decoding method. The other configurations of the system can be appropriately changed depending on a case.

FIG. 16 illustrates an overall configuration of a content providing system ex100 for implementing content distribution services. The area for providing communication services is divided into cells of desired size, and base stations ex106 to ex110 which are fixed wireless stations are placed in each of the cells.

The content providing system ex100 is connected to devices, such as a computer ex111, a personal digital assistant (PDA) ex112, a camera ex113, a cellular phone ex114, and a game machine ex115, via an Internet ex101, an Internet service provider ex102, a telephone network ex104, as well as the base stations ex106 to ex110.

However, the configuration of the content providing system ex100 is not limited to the configuration shown in FIG. 16, and a combination in which any of the elements are connected is acceptable. In addition, each of the devices may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing moving images. A camera ex116, such as a digital video camera, is capable of capturing both still images and moving images. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of a live show and others. For such a distribution, a content (for example, video of a music live show) captured by the user using the camera ex113 is coded as described above in each of Embodiments, and the coded content is transmitted to the streaming server ex103. On the other hand, the streaming server ex103 carries out stream distribution of the received content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (that is, functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and the moving images captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, generally, the computer ex111 and an LSI ex500 included in each of the devices perform such encoding and decoding processes. The LSI ex500 may be configured of a single chip or a plurality of chips. Software for encoding and decoding moving pictures may be integrated into some type of a recording medium (such as a CD-ROM, a flexible disk, a hard disk) that is readable by the computer ex111 and others, and the encoding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients can receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 17:
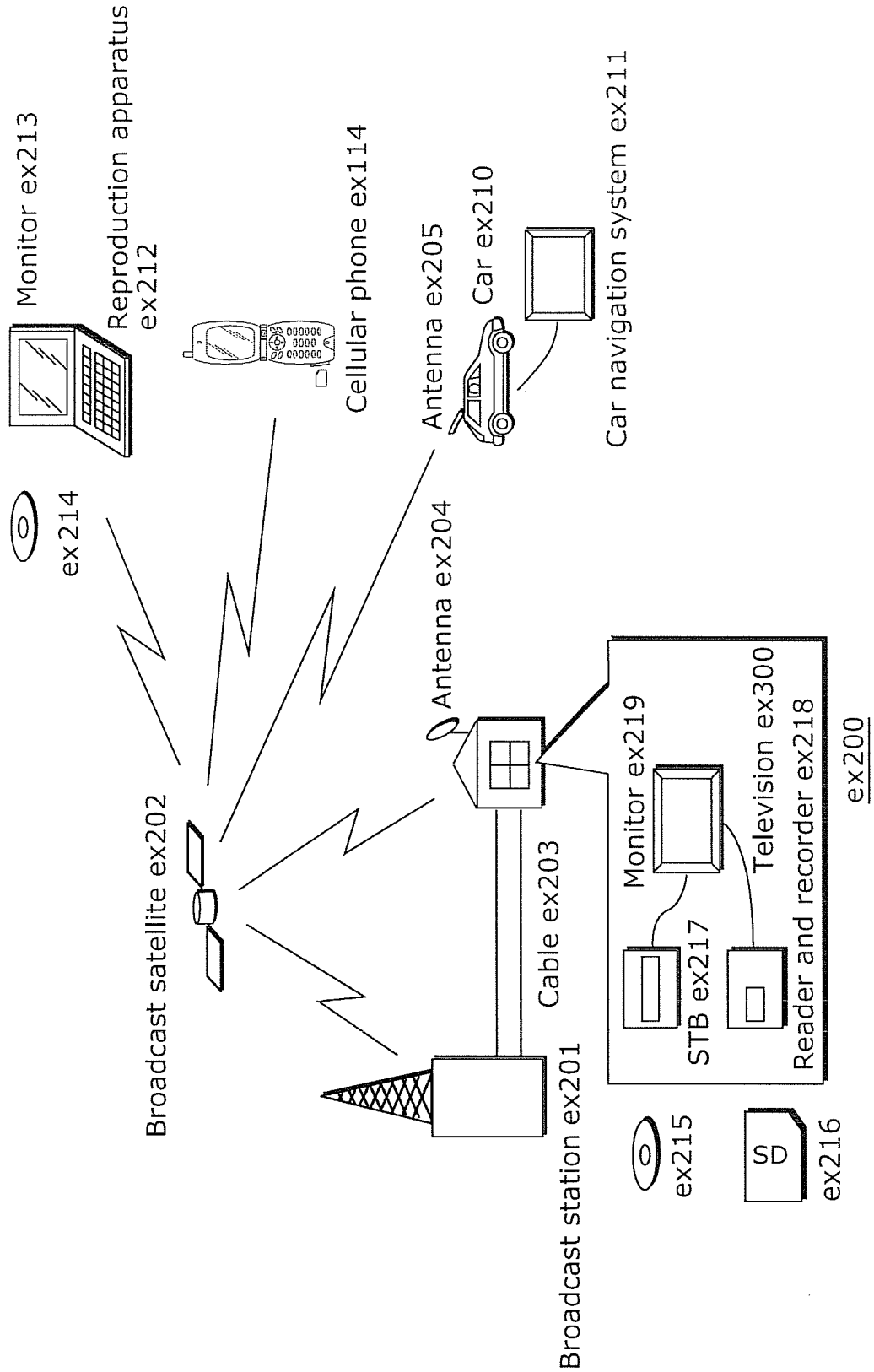
FIG. 17 illustrates an overall configuration of a digital broadcasting system.

The present disclosure is not limited to the above-mentioned content providing system ex100, and at least either the moving picture coding apparatus (image coding apparatus) or the moving picture decoding apparatus (image decoding apparatus) described in each of Embodiments can be incorporated into a digital broadcasting system ex200 as shown in FIG. 17. More specifically, a broadcast station ex201 communicates or transmits, via radio waves to a broadcast satellite ex202, multiplexed data obtained by multiplexing the audio data onto the video data. The video data is data coded according to the moving picture coding method described in each of Embodiments (that is, data coded by the image coding apparatus according to the aspect of the present disclosure). Upon receipt of the video data, the broadcast satellite ex202 transmits radio waves for broadcasting. Then, a home-use antenna ex204 capable of receiving a satellite broadcast receives the radio waves. A device, such as a television (receiver) ex300 and a set top box (STB) ex217, decodes the received multiplexed data and reproduces the data (that is, functions as the image decoding apparatus according to the aspect of the present disclosure).

Furthermore, a reader/recorder ex218 that (i) reads and decodes the multiplexed data recorded on a recording media ex215, such as a DVD and a BD, or (ii) codes video signals in the recording medium ex215, and in some cases, writes data obtained by multiplexing an audio signal on the coded data can include the moving picture decoding apparatus or the moving picture coding apparatus as shown in each of Embodiments. In this case, the reproduced video signals are displayed on the monitor ex219, and another apparatus or system can reproduce the video signals, using the recording medium ex215 on which the multiplexed data is recorded. Furthermore, it is also possible to implement the moving picture decoding apparatus in the set top box ex217 connected to the cable ex203 for a cable television or the antenna ex204 for satellite and/or terrestrial broadcasting, so as to display the video signals on the monitor ex219 of the television ex300. The moving picture decoding apparatus may be included not in the set top box but in the television ex300.

Figure 18:
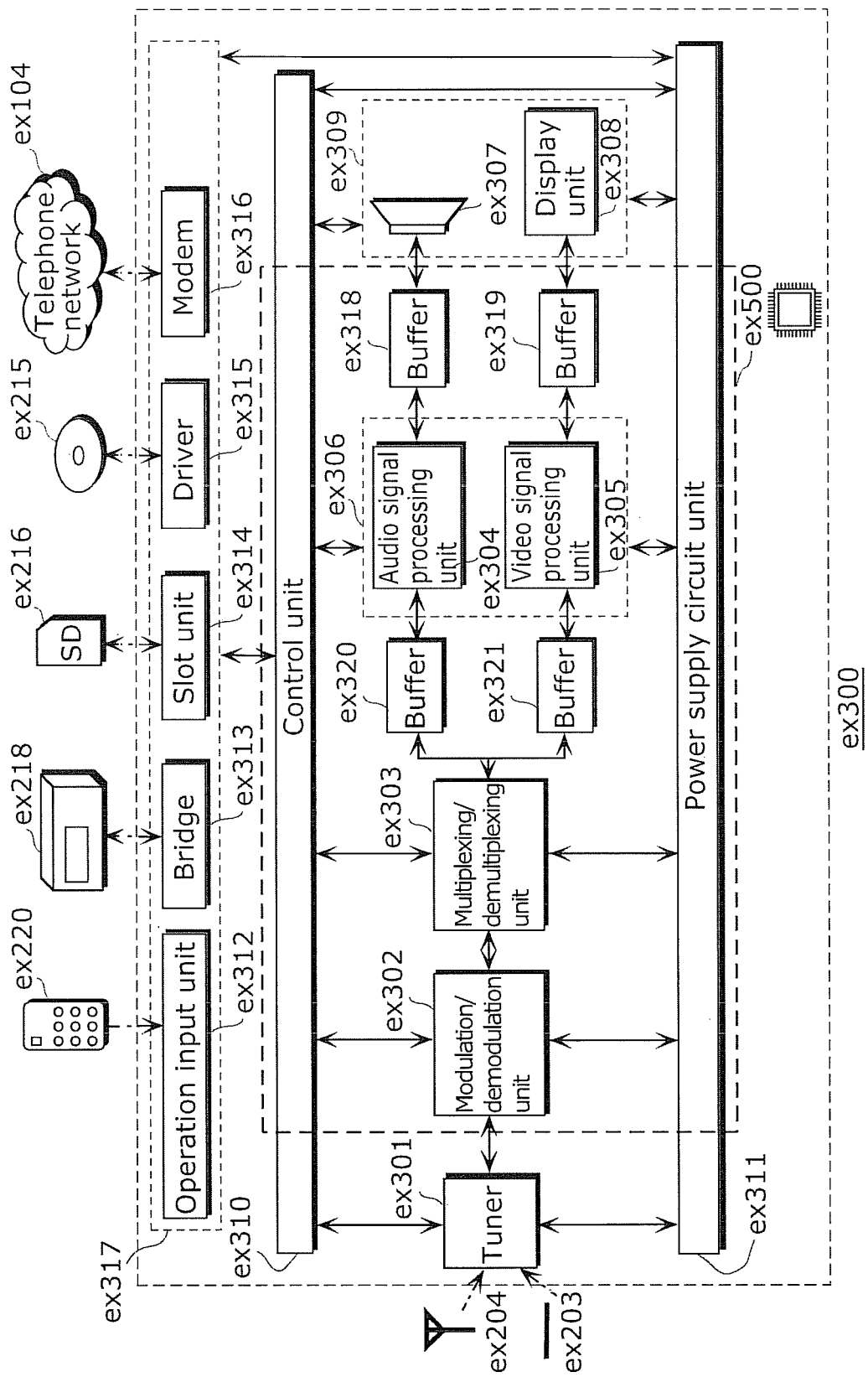
FIG. 18 illustrates a block diagram of an example of a configuration of a television.

FIG. 18 illustrates the television (receiver) ex300 that uses the moving picture coding method and the moving picture decoding method described in each of Embodiments. The television ex300 includes: a tuner ex301 that obtains or provides multiplexed data obtained by multiplexing the audio data and the video data through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes the video data and audio data coded by the signal processing unit ex306 into data.

Furthermore, the television ex300 further includes: a signal processing unit ex306 including an audio signal processing unit ex304 and a video signal processing unit ex305 that decode audio data and video data and code audio data and video data, respectively (which function as the image coding apparatus or the image decoding apparatus according to the aspect of the present disclosure); a speaker ex307 that provides the decoded audio signal; and an output unit ex309 including a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to one another through a synchronous bus.

First, a configuration in which the television ex300 decodes the multiplexed data obtained from outside through the antenna ex204 and others and reproduces the decoded data will be described. In the television ex300, upon receipt of a user operation from a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of Embodiments, in the television ex300. The output unit ex309 provides the decoded video signal and audio signal outside. When the output unit ex309 provides the video signal and the audio signal, the signals may be temporarily stored in buffers ex318 and ex319, and others so that the signals are reproduced in synchronization with each other. Furthermore, the television ex300 may read the multiplexed data not through a broadcast and others but from the recording media ex215 and ex216, such as a magnetic disk, an optical disc, and an SD card. Next, a configuration in which the television ex300 codes an audio signal and a video signal, and transmits the data outside or writes the data on a recording medium will be described. In the television ex300, upon receipt of a user operation from the remote controller ex220 and others, the audio signal processing unit ex304 codes an audio signal, and the video signal processing unit ex305 codes a video signal, under control of the control unit ex310 using the coding method as described in each of Embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in buffers ex320 and ex321, and others so that the signals are reproduced in synchronization with each other. Here, the buffers ex318 to ex321 may be plural as illustrated, or at least one buffer may be shared in the television ex300. Furthermore, data may be stored in a buffer other than the buffers ex318 to ex321 so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be not capable of performing all the processes but capable of only one of receiving, decoding, and providing outside data.

Furthermore, when the reader/recorder ex218 reads or writes the multiplexed data from or in a recording medium, one of the television ex300 and the reader/recorder ex218 may decode or code the multiplexed data, and the television ex300 and the reader/recorder ex218 may share the decoding or encoding.

Figure 19:
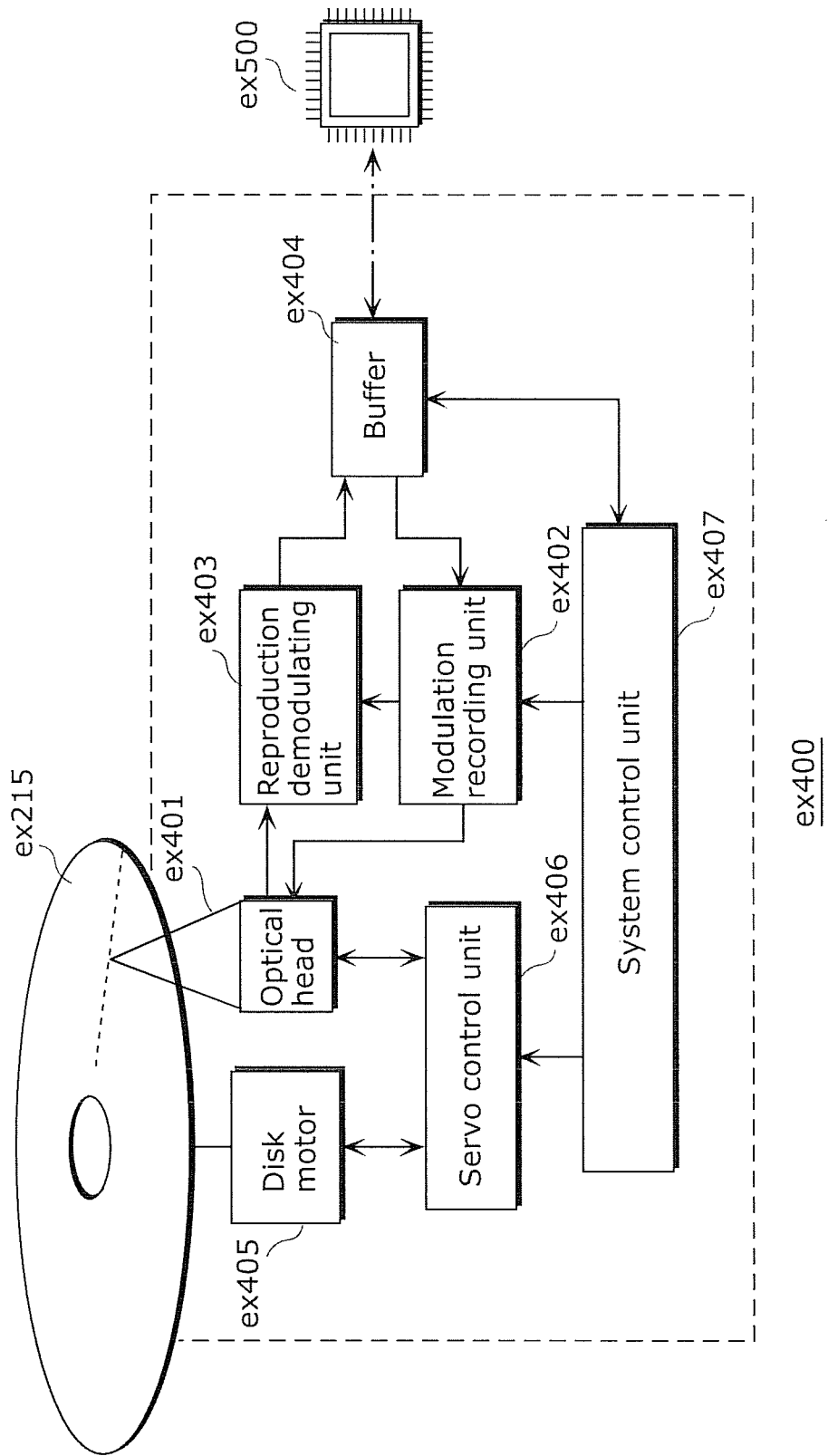
FIG. 19 illustrates a block diagram illustrating an example of a configuration of an information reproducing/recording unit that reads and writes information from or on a recording medium that is an optical disc.

As an example, FIG. 19 illustrates a configuration of an information reproducing/recording unit ex400 when data is read or written from or in an optical disc. The information reproducing/recording unit ex400 includes constituent elements ex401 to ex407 to be described hereinafter. The optical head ex401 irradiates a laser spot on a recording surface of the recording medium ex215 that is an optical disc to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. A disk motor ex405 rotates the recording medium ex215. A servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Figure 20:
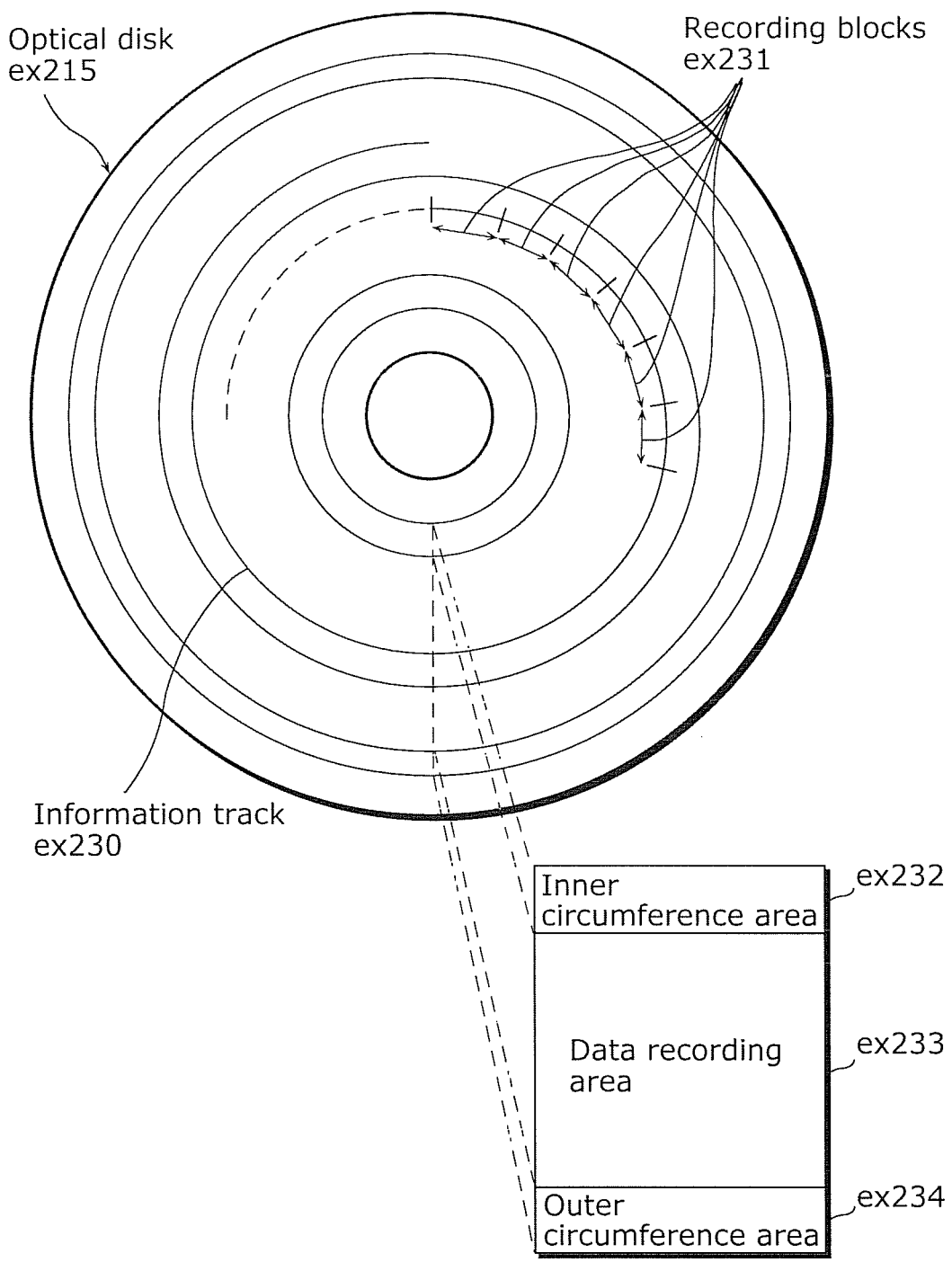
FIG. 20 illustrates an example of a configuration of a recording medium that is an optical disc.

Although the optical head ex401 irradiates a laser spot in the description, it may perform high-density recording using near field light FIG. 20 schematically illustrates the recording medium ex215 that is the optical disc. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. An apparatus that records and reproduces data reproduces the information track ex230 and reads the address information so as to determine the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio data, coded video data, or multiplexed data obtained by multiplexing the coded audio data and the coded video data, from and on the data recording area ex233 of the recording medium ex215.

Although an optical disc having a layer, such as a DVD and a BD is described as an example in the description, the optical disc is not limited to such, and may be an optical disc having a multilayer structure and capable of being recorded on a part other than the surface. Furthermore, the optical disc may have a structure for multidimensional recording/reproduction, such as recording of information using light of colors with different wavelengths in the same portion of the optical disc and recording information having different layers from various angles.

Furthermore, the car ex210 having the antenna ex205 can receive data from the satellite ex202 and others, and reproduce video on the display device such as the car navigation system ex211 set in the car ex210, in a digital broadcasting system ex200. Here, a configuration of the car navigation system ex211 will be the one for example, including a GPS receiving unit in the configuration illustrated in FIG. 18. The same will be true for the configuration of the computer ex111, the cellular phone ex114, and others.

Figure 21A:
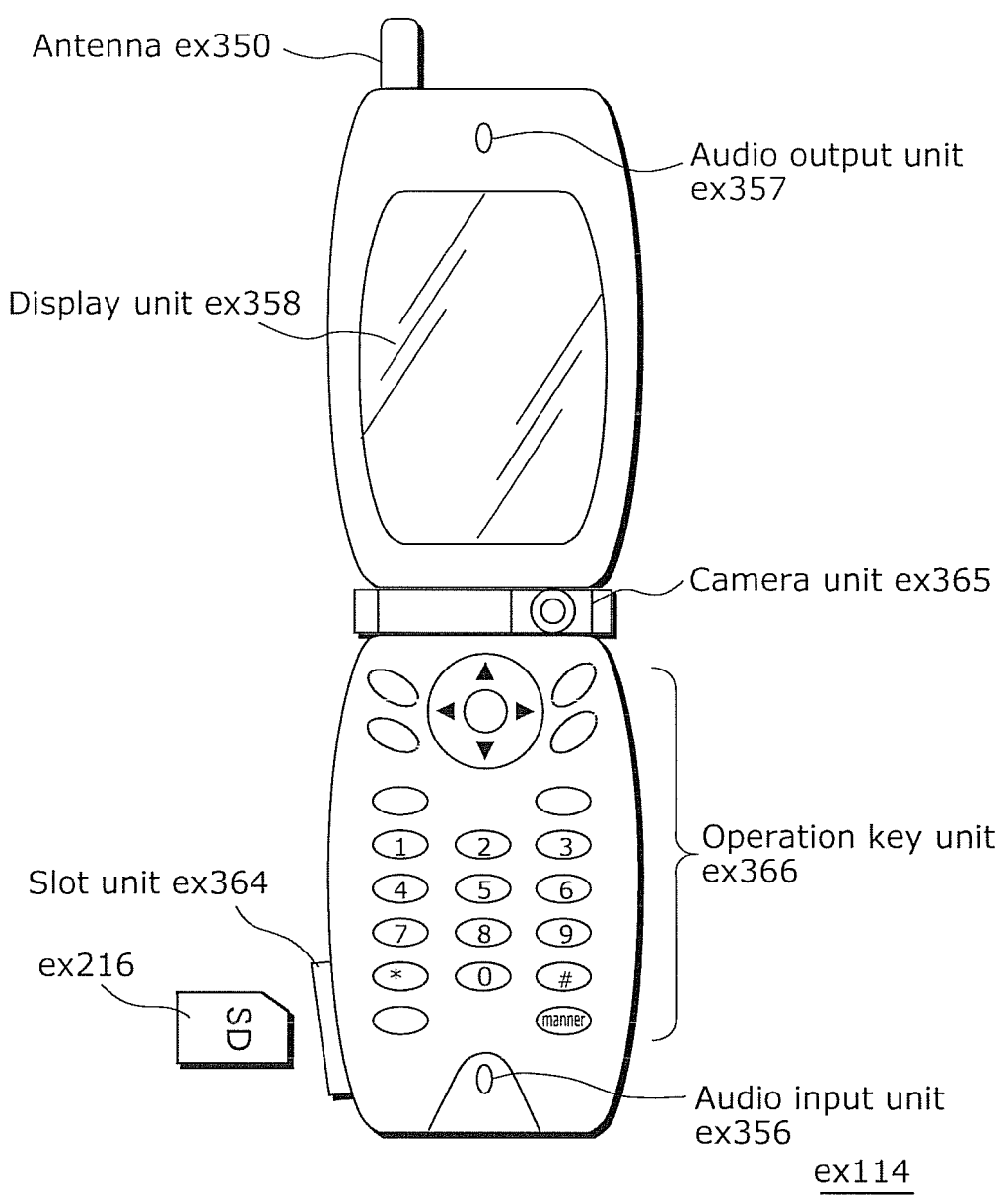
FIG. 21A illustrates an example of a cellular phone.

FIG. 21A illustrates the cellular phone ex114 that uses the moving picture coding method and the moving picture decoding method described in each of Embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including a set of operation keys ex366; an audio output unit ex357 such as a speaker for output of audio; an audio input unit ex356 such as a microphone for input of audio; a memory unit ex367 for storing captured video or still pictures, recorded audio, coded or decoded data of the received video, the still images, e-mails, or others; and a slot unit ex364 that is an interface unit for a recording medium that stores data in the same manner as the memory unit ex367.

Figure 21B:
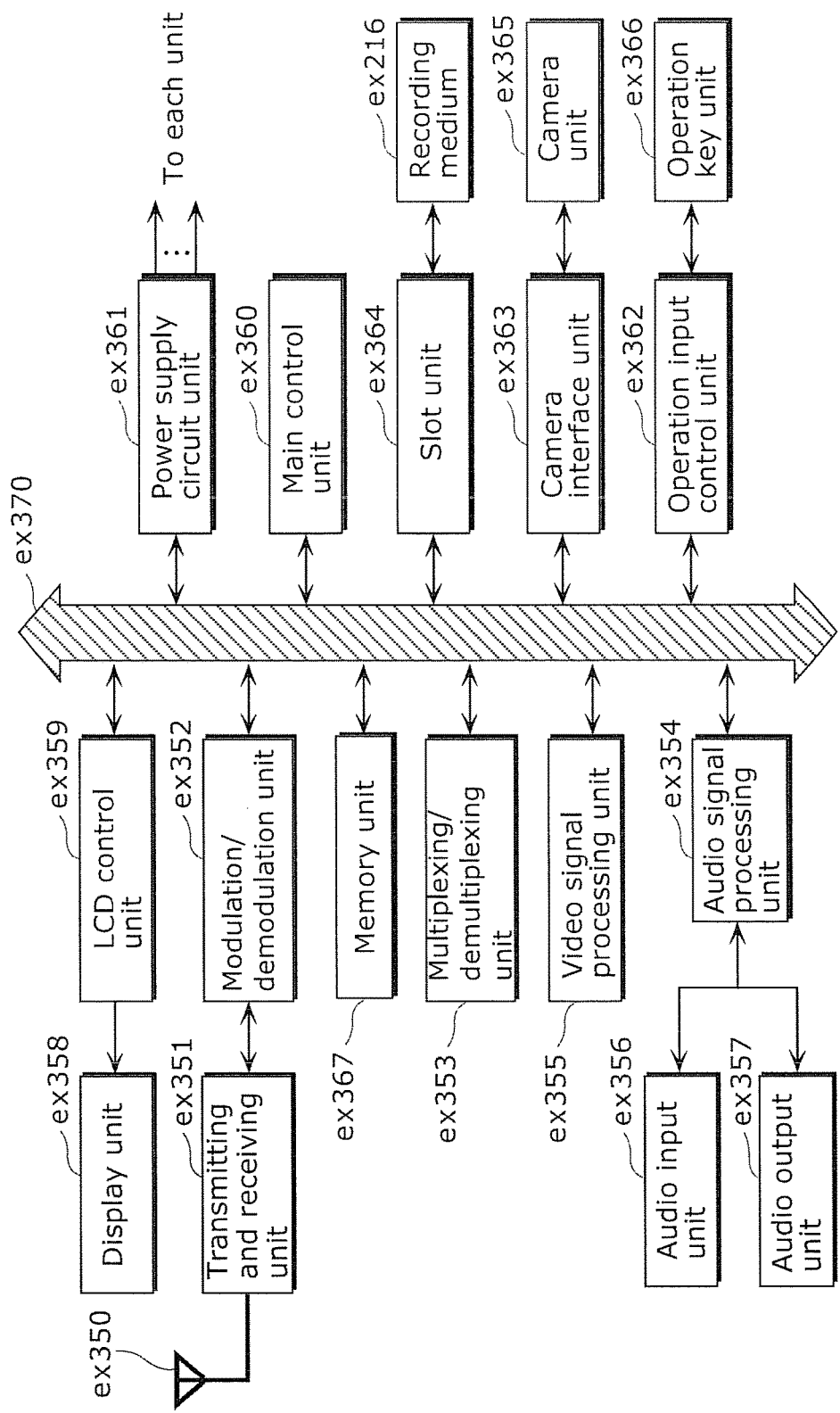
FIG. 21B illustrates a block diagram of an example of a configuration of the cellular phone.

Next, an example of a configuration of the cellular phone ex114 will be described with reference to FIG. 21B. In the cellular phone ex114, a main control unit ex360 designed to control overall each unit of the main body including the display unit ex358 as well as the operation keys ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation keys ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 (that is, functioning as the image coding apparatus according to the aspect of the present disclosure) compresses and codes video signals supplied from the camera unit ex365 using the moving picture coding method shown in each of Embodiments, and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 (that is, functioning as the image decoding apparatus according to the aspect of the present disclosure) decodes the video signal using a moving picture decoding method corresponding to the moving picture coding method shown in each of Embodiments, and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method or the moving picture decoding method in each of Embodiments can be used in any of the devices and systems described. Thus, the advantages described in each of Embodiments can be obtained.

Furthermore, the present disclosure is not limited to Embodiments, and various modifications and revisions are possible without departing from the scope of the present disclosure.

(Embodiment 4)

Video data can be generated by switching, as necessary, between (i) the moving picture coding method or the moving picture coding apparatus shown in each of Embodiments and (ii) a moving picture coding method or a moving picture coding apparatus in conformity with a different standard, such as MPEG-2, MPEG4-AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method or by the moving picture coding apparatus shown in each of Embodiments will be hereinafter described. The multiplexed data is a digital stream in the MPEG-2 Transport Stream format.

FIG. 22 illustrates a structure of multiplexed data. As illustrated in FIG. 22, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of a movie. Here, the primary video is normal video to be displayed on a screen, and the secondary video is video to be displayed on a smaller window in the main video. Furthermore, the interactive graphics stream represents an interactive screen to be generated by arranging the GUI components on a screen. The video stream is coded in the moving picture coding method or by the moving picture coding apparatus shown in each of Embodiments, or in a moving picture coding method or by a moving picture coding apparatus in conformity with a conventional standard, such as MPEG-2, MPEG4-AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary video to be mixed with the primary audio.

Figure 23:
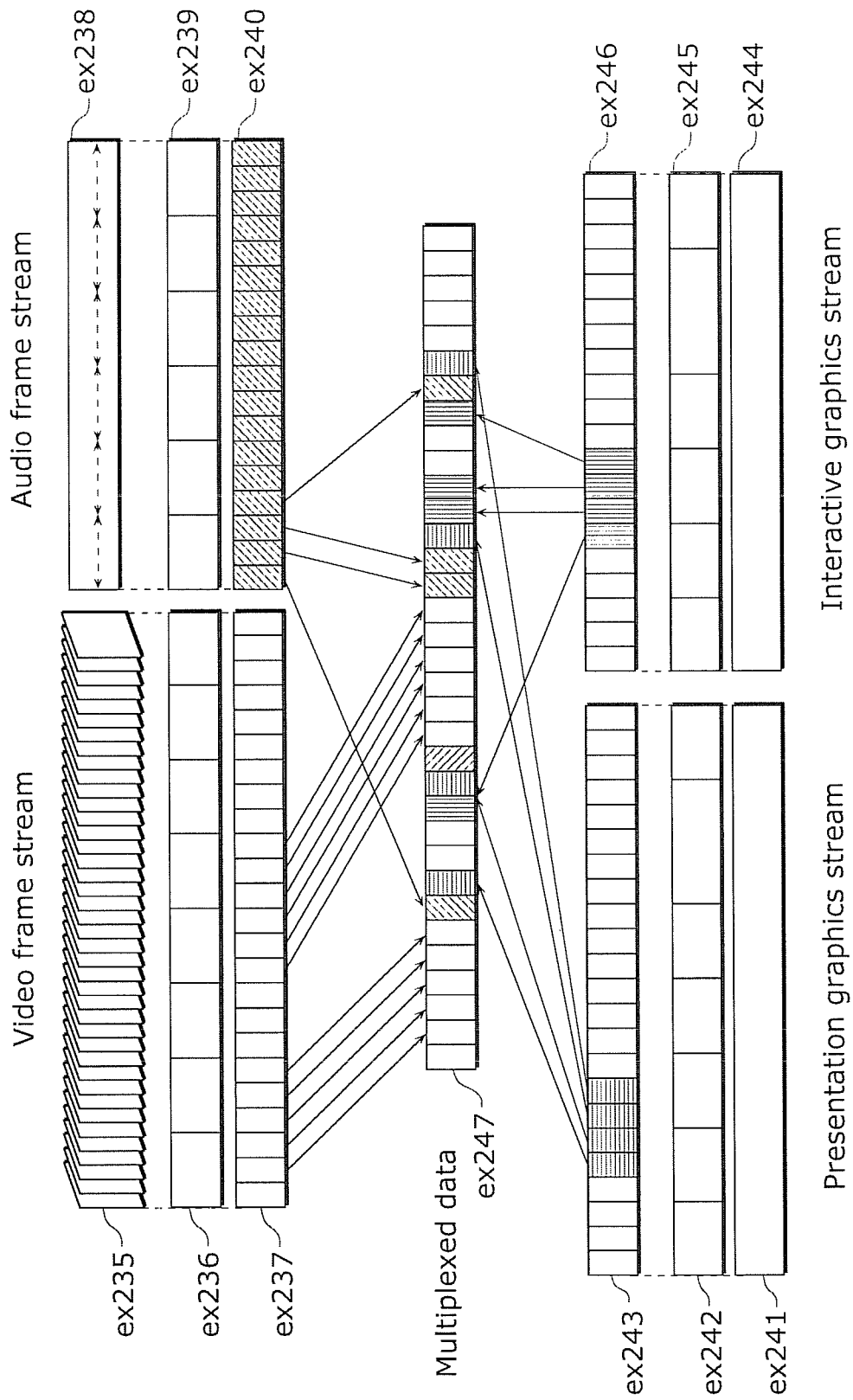
FIG. 23 schematically illustrates how each stream is multiplexed in multiplexed data.

FIG. 23 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 24:
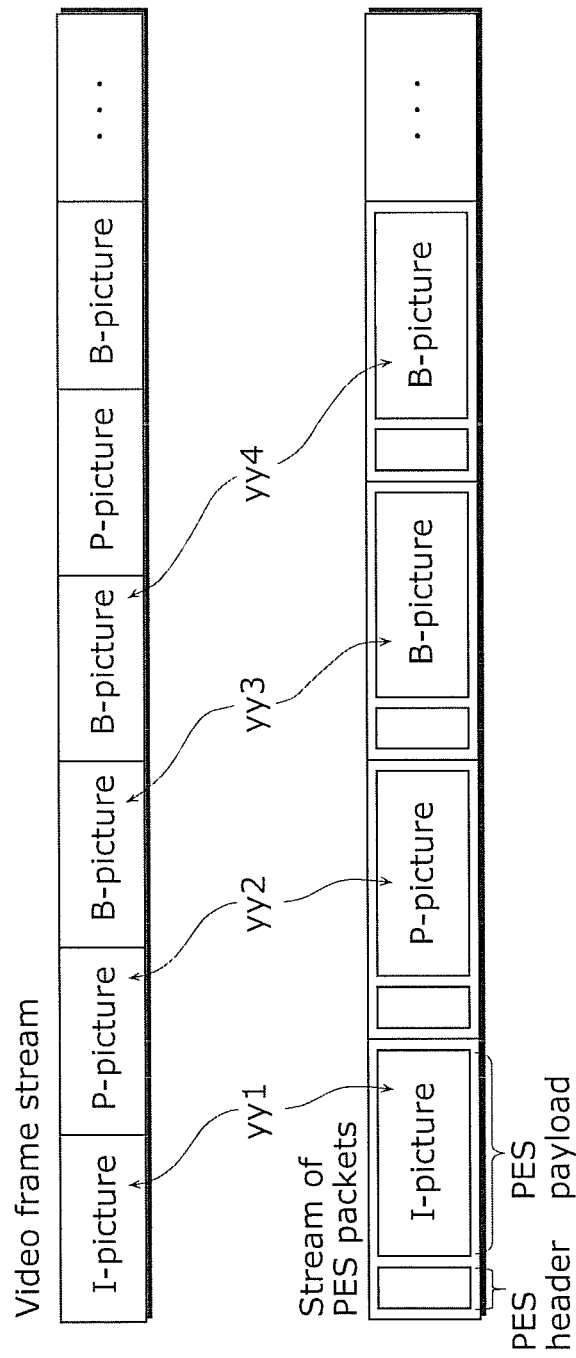
FIG. 24 illustrates how a video stream is stored in a stream of PES packets in more detail.

FIG. 24 illustrates how a video stream is stored in a stream of PES packets in more detail. The first bar in FIG. 24 shows a video frame stream in a video stream. The second bar shows the stream of PES packets. As indicated by arrows yy1, yy2, yy3, and yy4 in FIG. 24, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 25:
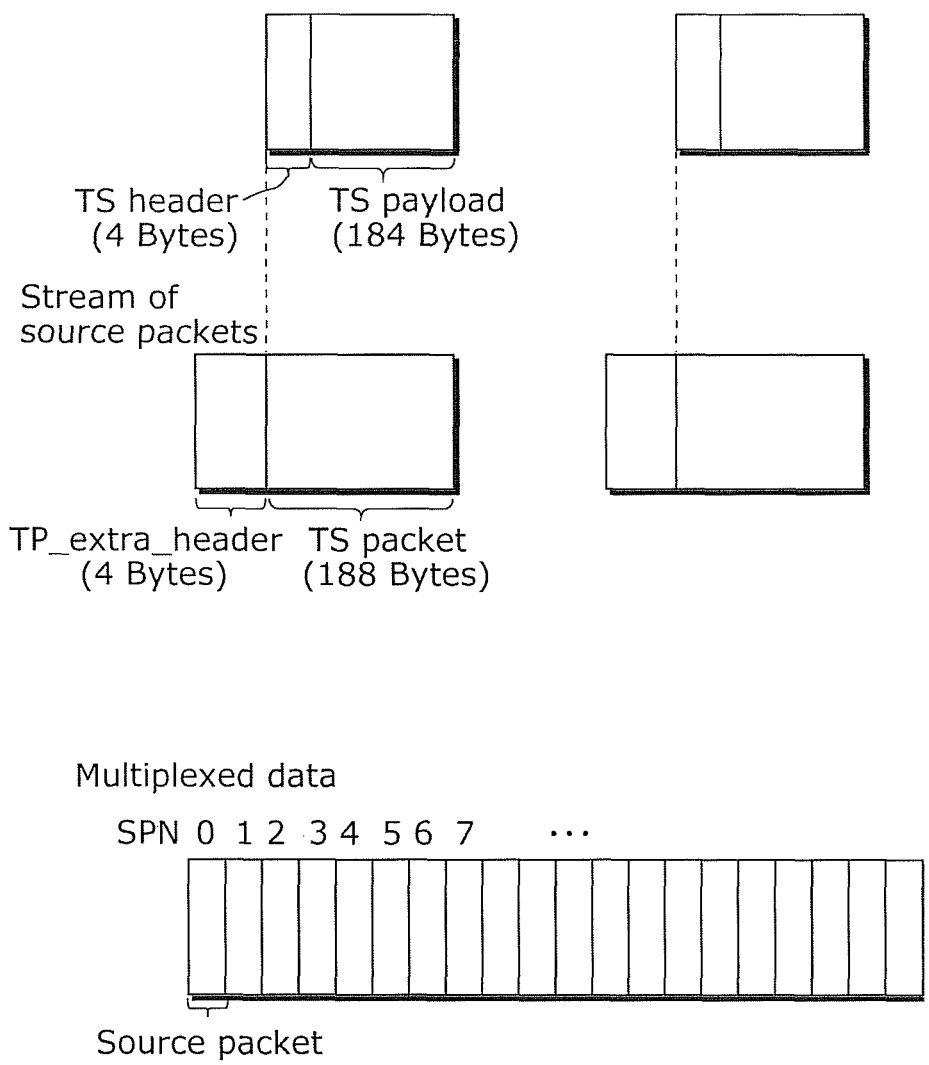
FIG. 25 illustrates a structure of TS packets and source packets in the multiplexed data.

FIG. 25 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The numbers incrementing from the head of the multiplexed data are called source packet numbers (SPNs) as shown at the bottom of FIG. 25.

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 26:
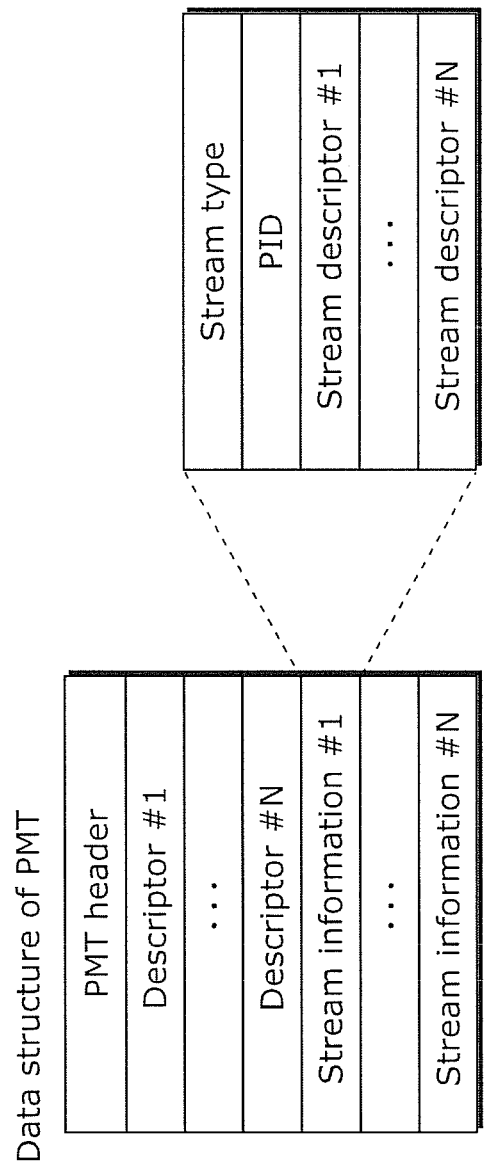
FIG. 26 illustrates a data structure of a PMT.

FIG. 26 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 27:
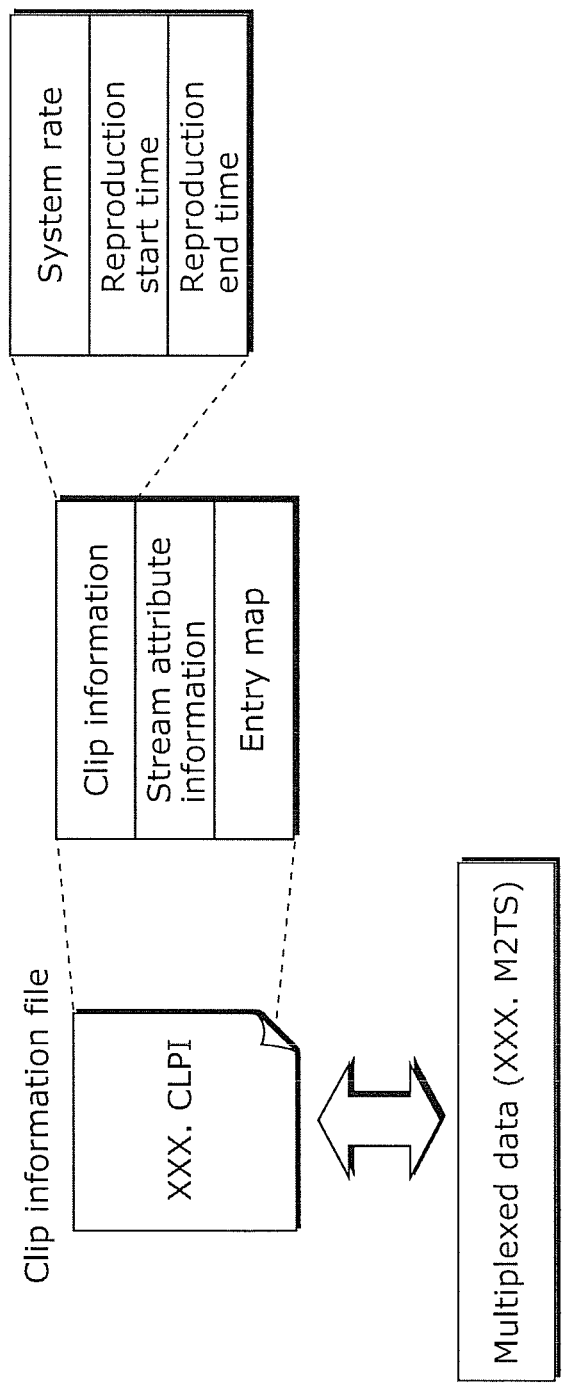
FIG. 27 illustrates an internal structure of multiplexed data information.

Each of the multiplexed data information files is management information of the multiplexed data as shown in FIG. 27. The multiplexed data information files are in one to one correspondence with the multiplexed data, and each of the files includes multiplexed data information, stream attribute information, and an entry map.

As illustrated in FIG. 27, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 28:
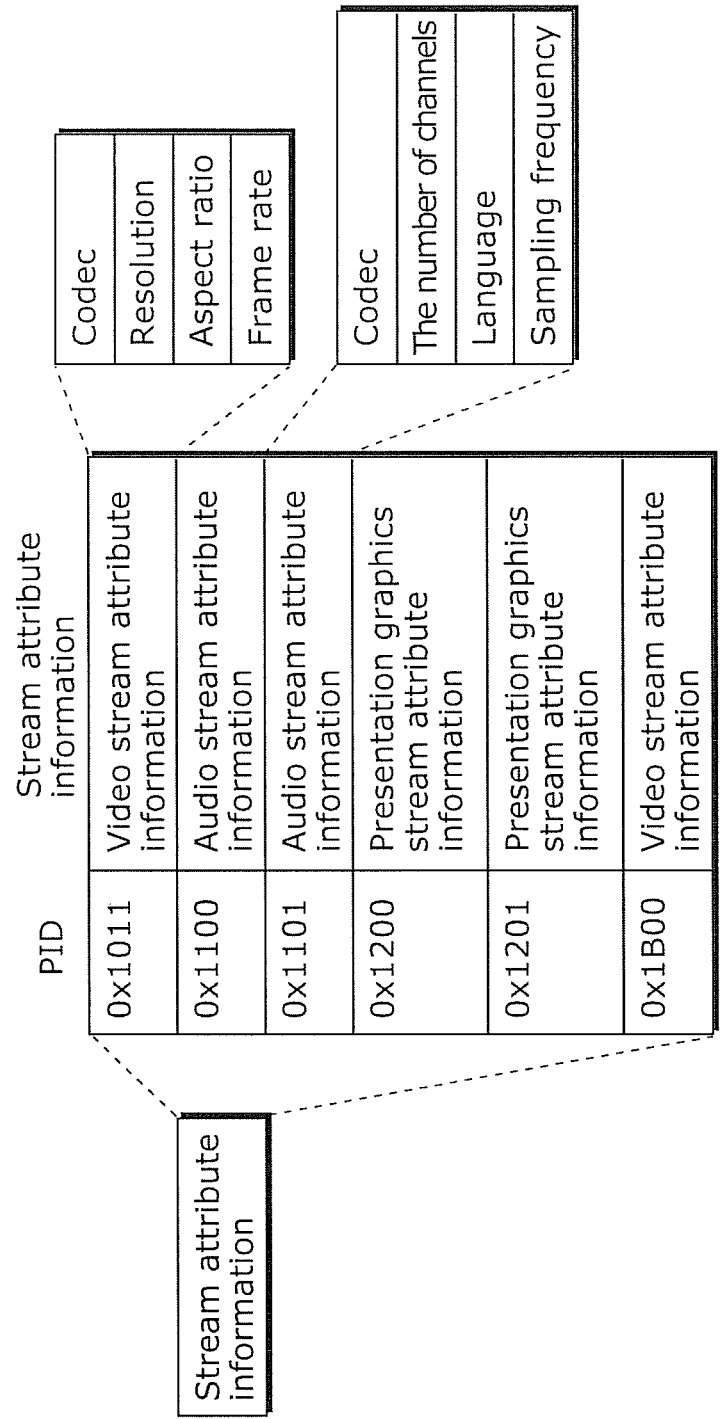
FIG. 28 illustrates an internal structure of stream attribute information.

As shown in FIG. 28, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information. In Embodiment 4, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of Embodiments includes a step or a unit for allocating unique information indicating video data generated by the moving picture coding method or the moving picture coding apparatus in each of Embodiments, to the stream type included in the PMT or the video stream attribute information. With the structure, the video data generated by the moving picture coding method or the moving picture coding apparatus described in each of Embodiments can be distinguished from video data that conforms to another standard.

Figure 29:
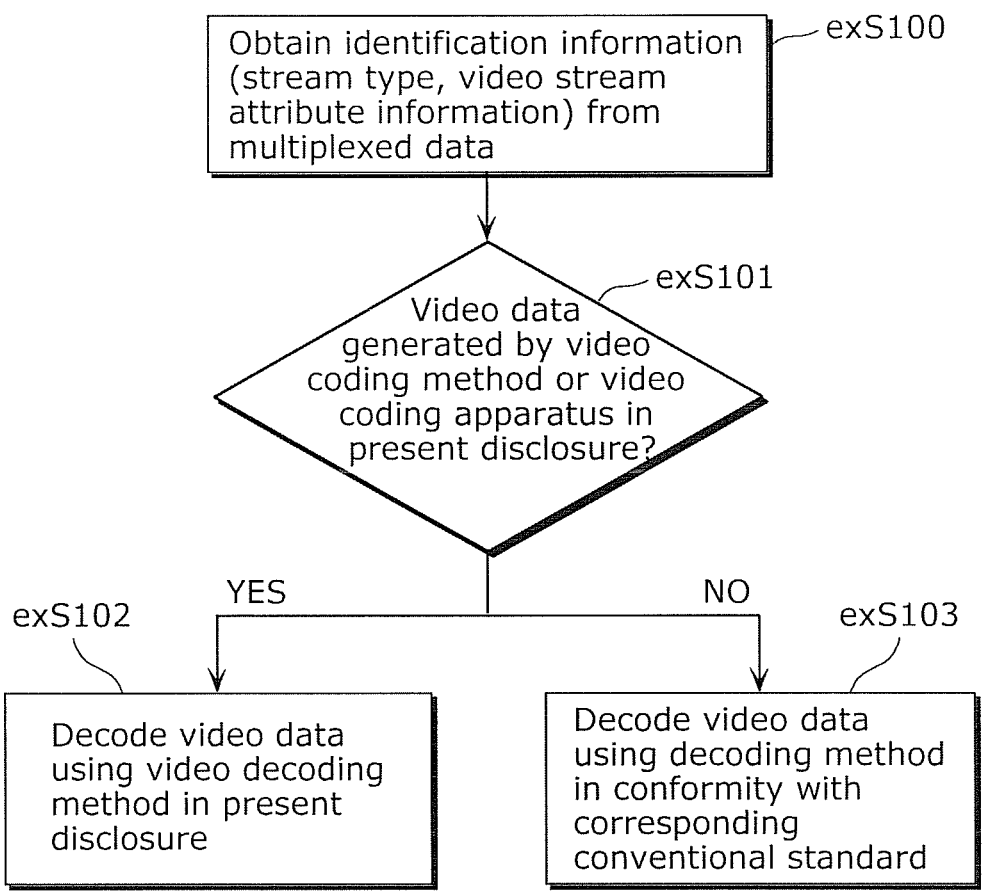
FIG. 29 illustrates steps for identifying video data.

Furthermore, FIG. 29 illustrates steps of the moving picture decoding method according to Embodiment 4. In Step exS100, the stream type included in the PMT or the video stream attribute information is obtained from the multiplexed data. Next, in Step exS101, it is determined whether or not the stream type or the video stream attribute information indicates that the multiplexed data is generated by the moving picture coding method or the moving picture coding apparatus in each of Embodiments. When it is determined that the stream type or the video stream attribute information indicates that the multiplexed data is generated by the moving picture coding method or the moving picture coding apparatus in each of Embodiments, in Step exS102, the stream type or the video stream attribute information is decoded by the moving picture decoding method in each of Embodiments. Furthermore, when the stream type or the video stream attribute information indicates conformance to the conventional standards, such as MPEG-2, MPEG4-AVC, and VC-1, in Step exS103, the stream type or the video stream attribute information is decoded by a moving picture decoding method in conformity with the conventional standards.

As such, allocating a new unique value to the stream type or the video stream attribute information enables determination whether or not the moving picture decoding method or the moving picture decoding apparatus that is described in each of Embodiments can perform decoding. Even upon an input of multiplexed data that conforms to a different standard, an appropriate decoding method or apparatus can be selected. Thus, it becomes possible to decode information without any error. Furthermore, the moving picture coding method or apparatus, or the moving picture decoding method or apparatus in Embodiment 4 can be used in the devices and systems described above.

(Embodiment 5)

Figure 30:
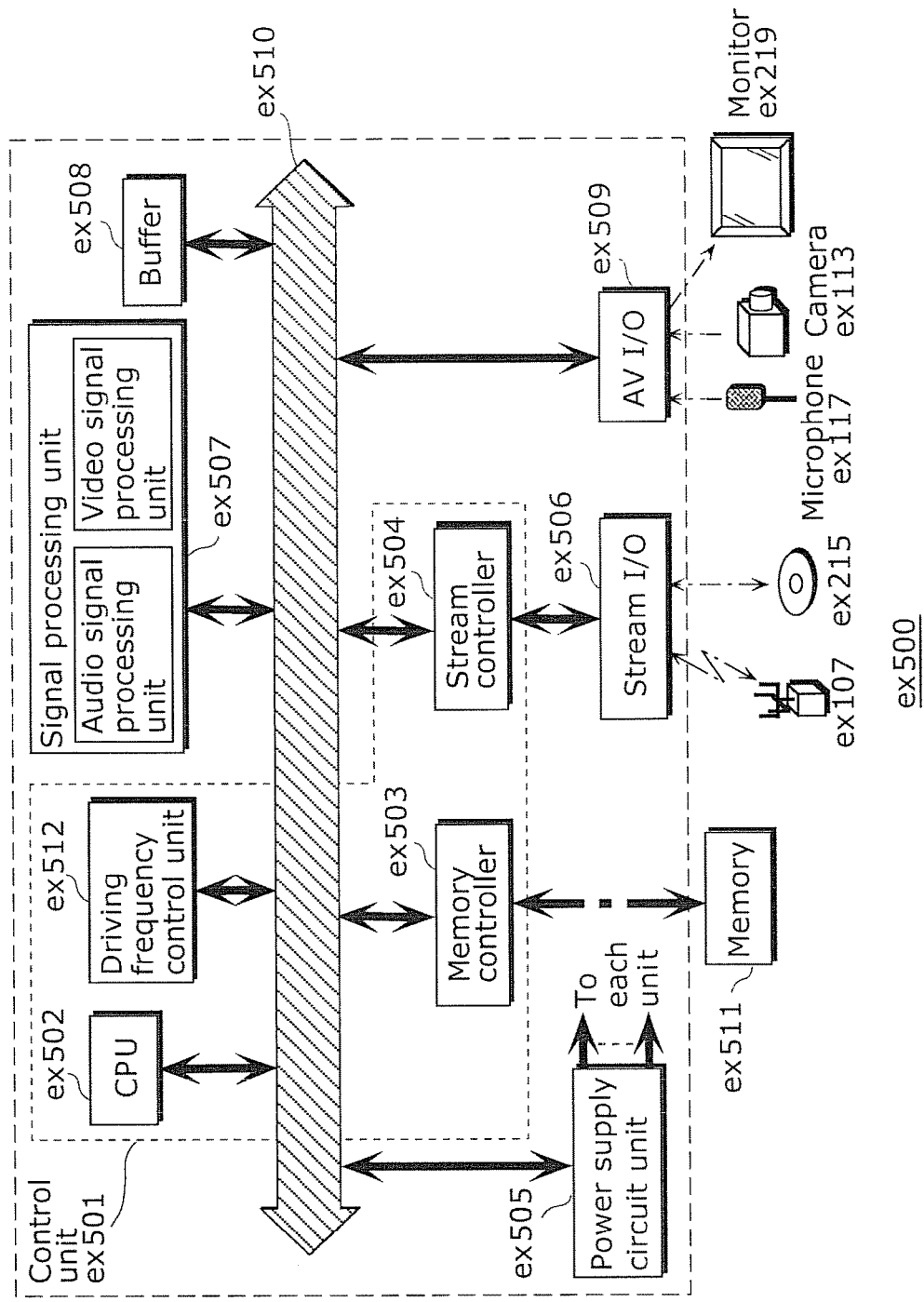
FIG. 30 illustrates a block diagram illustrating an example of a configuration of an integrated circuit for implementing a moving picture coding method and a moving picture decoding method according to each of Embodiments.

Each of the moving picture coding method, the moving picture coding apparatus, the moving picture decoding method, and the moving picture decoding apparatus in each of Embodiments is typically achieved in the form of an integrated circuit or a Large Scale Integrated (LSI) circuit. As an example of the LSI, FIG. 30 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of Embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording media ex215. When data sets are multiplexed, the data sets should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may include the signal processing unit ex507, or an audio signal processing unit that is a part of the signal processing unit ex507. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. The programmable logic device can typically execute the moving picture coding method and the moving picture decoding method according to Embodiments and Variations, by loading or reading, from a memory, the program included in software or firmware.

In the future, with advancement in semiconductor technology, a brand-new technology may replace LSI. The functional blocks can be integrated using such a technology. The possibility is that the present disclosure is applied to biotechnology.

(Embodiment 6)

When video data generated by the moving picture coding method or by the moving picture coding apparatus described in each of Embodiments is decoded, compared to the case of decoding video data that conforms to a conventional standard, such as MPEG-2, MPEG4-AVC, and VC-1, the computing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 31:
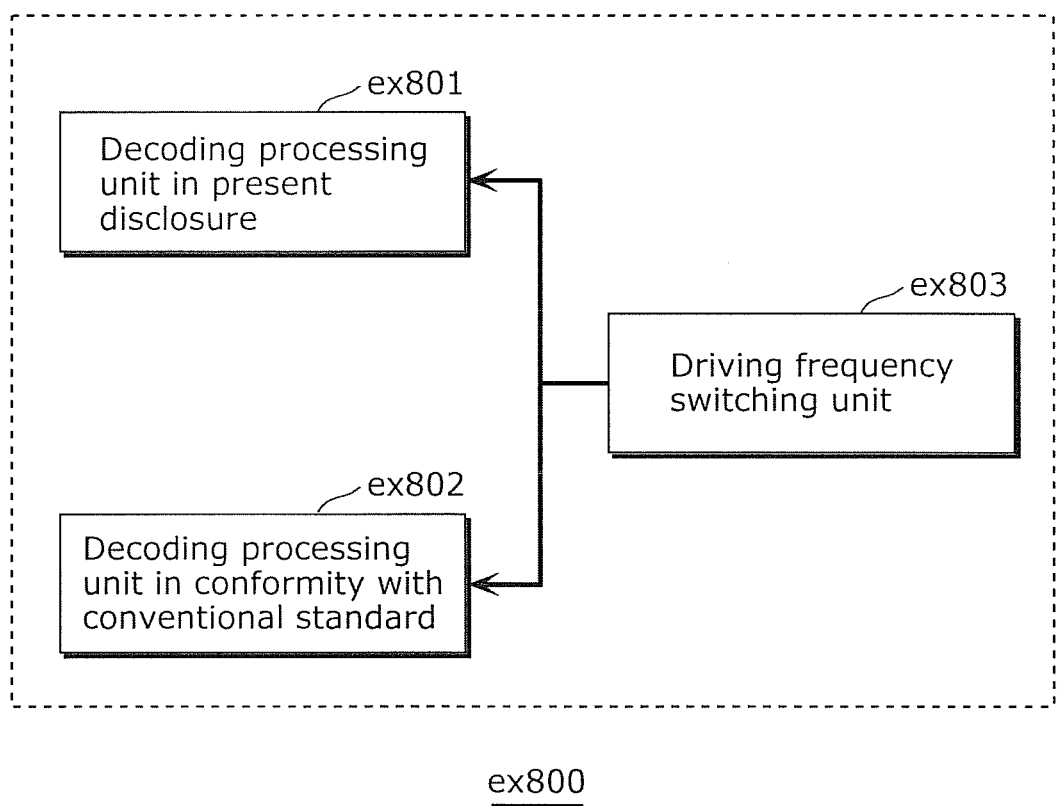
FIG. 31 illustrates a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 31 illustrates a configuration ex800 in Embodiment 6. A driving frequency switching unit ex803 sets a driving frequency to a higher driving frequency when video data is generated by the moving picture coding method or the moving picture coding apparatus described in each of Embodiments. Then, the driving frequency switching unit ex803 instructs a decoding processing unit ex801 that executes the moving picture decoding method described in each of Embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of Embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 30. Here, each of the decoding processing unit ex801 that executes the moving picture decoding method described in each of Embodiments and the decoding processing unit ex802 that conforms to the conventional standard corresponds to the signal processing unit ex507 in FIG. 30. The CPU ex502 determines to which standard the video data conforms. Then, the driving frequency control unit ex512 determines a driving frequency based on a signal from the CPU ex502. Furthermore, the signal processing unit ex507 decodes the video data based on a signal from the CPU ex502. For example, the identification information described in Embodiment 4 is probably used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 33. The driving frequency can be selected by storing the look-up table in the buffer ex508 and an internal memory of an LSI, and with reference to the look-up table by the CPU ex502.

Figure 32:
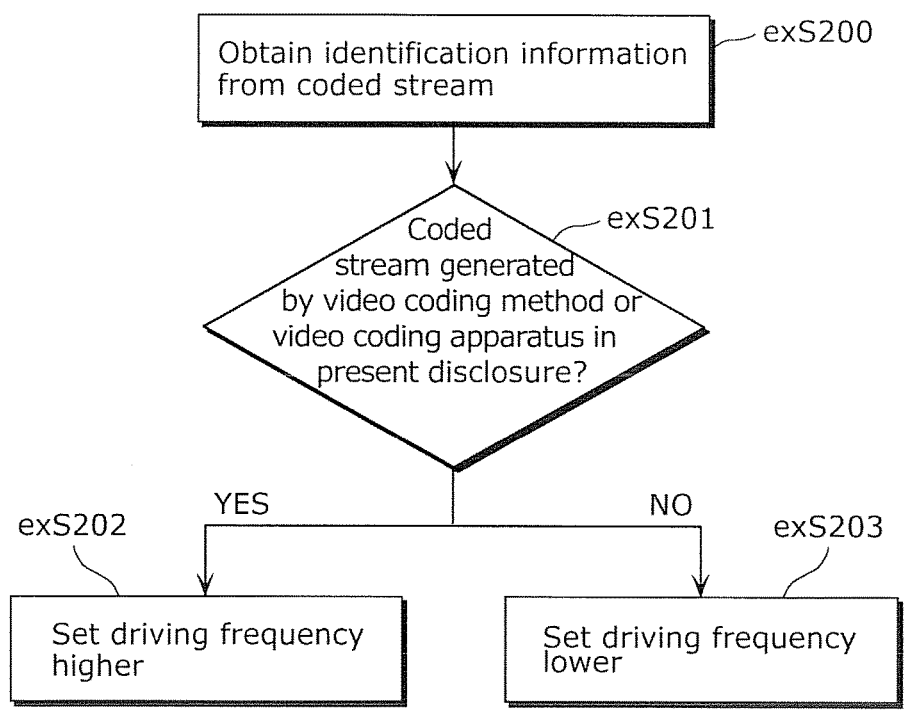
FIG. 32 illustrates steps for identifying video data and switching between driving frequencies.

FIG. 32 illustrates steps for executing a method in Embodiment 6. First, in Step exS200, the signal processing unit ex507 obtains identification information from the multiplexed data. Next, in Step exS201, the CPU ex502 determines whether or not the video data is generated based on the identification information by the coding method and the coding apparatus described in each of Embodiments. When the video data is generated by the coding method or the coding apparatus described in each of Embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG4-AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the coding method or the coding apparatus described in each of Embodiments.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the computing amount for decoding is larger, the driving frequency may be set higher, and when the computing amount for decoding is smaller, the driving frequency may be set lower as the method for setting the driving frequency. Thus, the setting method is not limited to the ones described above. For example, when the computing amount for decoding video data in conformity with MPEG4-AVC is larger than the computing amount for decoding video data generated by the moving picture coding method or the moving picture coding apparatus described in each of Embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method or the moving picture coding apparatus described in each of Embodiments, the voltage to be applied to the LSI ex500 or the apparatus including the LSI ex500 is probably set higher. When the identification information indicates that the video data conforms to the conventional standard, such as MPEG-2, MPEG4-AVC, and VC-1, the voltage to be applied to the LSI ex500 or the apparatus including the LSI ex500 is probably set lower. As another example, when the identification information indicates that the video data is generated by the moving picture coding method or the video coding apparatus described in each of Embodiments, the driving of the CPU ex502 does not probably have to be suspended. When the identification information indicates that the video data conforms to the conventional standard, such as MPEG-2, MPEG4-AVC, and VC-1, the driving of the CPU ex502 is probably suspended at a given time because the CPU ex502 has extra processing capacity. Even when the identification information indicates that the video data is generated by the moving picture coding method or the moving picture coding apparatus described in each of Embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG4-AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

(Embodiment 7)

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 34A:
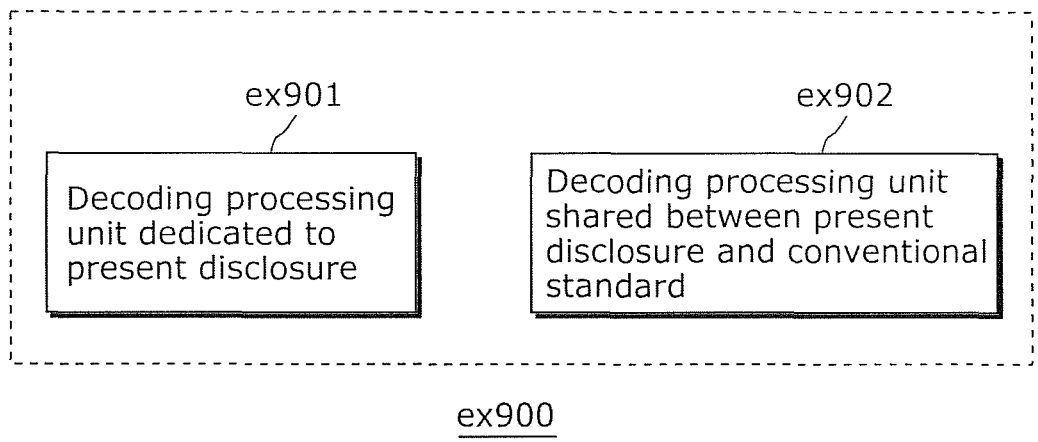
FIG. 34A illustrates an example of a configuration for sharing a module of a signal processing unit.

In order to solve the problems, what is conceived is a configuration in which the decoding processing unit for implementing the moving picture decoding method described in each of Embodiments and the decoding processing unit that conforms to the conventional standard, such as MPEG-2, MPEG4-AVC, and VC-1 are partly shared. Ex900 in FIG. 34A shows an example of the configuration. For example, the moving picture decoding method described in each of Embodiments and the moving picture decoding method that conforms to MPEG4-AVC have, partly in common, the details of processing, such as entropy coding, inverse quantization, deblocking filtering, and motion compensation. The details of processing to be shared probably include use of a decoding processing unit ex902 that conforms to MPEG4-AVC. In contrast, a dedicated decoding processing unit ex901 is probably used for other processing which is unique to the present disclosure and does not conform to MPEG-4 AVC. The decoding processing unit for implementing the moving picture decoding method described in each of Embodiments may be shared for the processing to be shared, and a dedicated decoding processing unit may be used for processing unique to that of MPEG4-AVC.

Figure 34B:
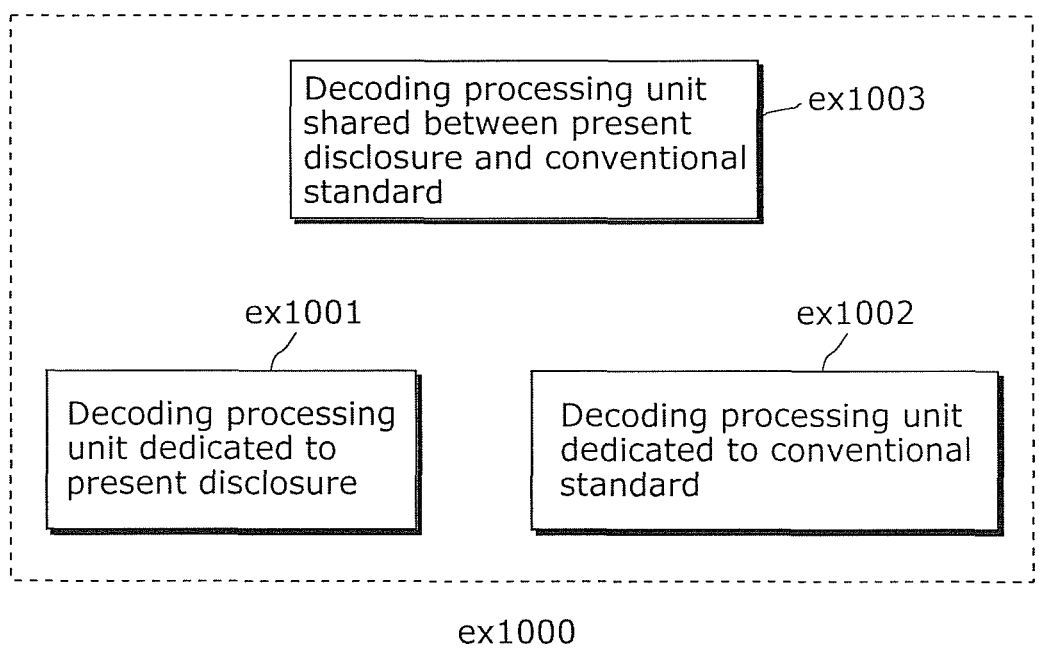
FIG. 34B illustrates an example of a configuration for sharing a module of a signal processing unit.

Furthermore, ex1000 in FIG. 34B shows another example in which processing is partly shared. This example uses a configuration including a dedicated decoding processing unit ex1001 that supports the processing unique to the aspect of the present disclosure, a dedicated decoding processing unit ex1002 that supports the processing unique to another conventional standard, and a decoding processing unit ex1003 that supports processing to be shared between the moving picture decoding method in the aspect of the present disclosure and the conventional moving picture decoding method. Here, the dedicated decoding processing units ex1001 and ex1002 are not necessarily specialized for the processing of the aspect of the present disclosure and the processing of the conventional standard, and may be the ones capable of implementing general processing. Furthermore, the configuration of Embodiment 7 can be implemented by the LSI ex500.

As such, reducing the scale of the circuit of an LSI and reducing the cost are possible by sharing the decoding processing unit for the processing to be shared between the moving picture decoding method in the present disclosure and the moving picture decoding method in conformity with the conventional standard.

The herein disclosed subject matter is to be considered descriptive and illustrative only, and the appended Claims are of a scope intended to cover and encompass not only the particular embodiments disclosed, but also equivalent structures, methods, and/or uses.

INDUSTRIAL APPLICABILITY

The present invention has an advantage of accelerating processing with almost no reduction in the coding efficiency, and is applicable to various uses, such as accumulation, transmission, and communication of data. The present invention is applicable to, for example, information display apparatuses and image-capturing apparatuses, such as televisions, digital video recorders, car navigation systems, mobile phones, digital cameras, and digital video cameras, and is highly suitable for practical use.

The invention claimed is:

1. A method comprising:
   determining a sample adaptive offset (SAO) type parameter for a SAO value;
   encoding the SAO type parameter into an encoded bitstream, wherein the SAO type parameter indicates that the SAO value is a band offset value;
   determining the SAO value, to be added to a pixel value of a reconstructed image, represented as an integer indicating the magnitude of the SAO value and a sign parameter indicating the sign of the SAO value;
   encoding the determined integer into the encoded bitstream using bypass arithmetic coding with a fixed probability; and
   encoding the determined sign parameter into the encoded bitstream using bypass arithmetic coding with the fixed probability.

2. The method of claim 1, wherein the fixed probability is a 50% probability.

3. The method of claim 1, wherein the SAO type parameter indicates that the SAO value is an edge offset value.

4. An apparatus, comprising:
   at least one processor;
   at least one memory including computer program code, the memory and the computer program code configured to, working with the at least one processor, cause the apparatus to perform at least the following:
   decode a sample adaptive offset (SAO) type parameter from a bitstream;
   determine an SAO type for an SAO value from the SAO type parameter, wherein the SAO type parameter indicates that the SAO value is a band offset value;
   decode from the bitstream, using bypass arithmetic coding with a fixed probability, an integer indicating the magnitude of the SAO value;
   decode from the bitstream, using bypass arithmetic coding with the fixed probability, a sign parameter indicating the sign of the SAO value; and
   determine the SAO value using the decoded integer and the decoded sign parameter.

5. The apparatus of claim 4, wherein the memory and the computer program code are configured to, working with the at least one processor, cause the apparatus to add the SAO value to a pixel value of an image.

6. The apparatus of claim 4, wherein the fixed probability is a 50% probability.

7. The apparatus of claim 4, wherein the SAO type parameter indicates that the SAO value is an edge offset value.

8. A method comprising:
   decoding a sample adaptive offset (SAO) type parameter from a bitstream;
   determining an SAO type for an SAO value from the SAO type parameter, wherein the SAO type parameter indicates that the SAO value is a band offset value;
   decoding from the bitstream, using bypass arithmetic coding with a fixed probability, an integer indicating the magnitude of the SAO value;

decoding from the bitstream, using bypass arithmetic coding with the fixed probability, a sign parameter indicating the sign of the SAO value; and determining the SAO value using the decoded integer and the decoded sign parameter.

9. The method of claim 8, further comprising adding the SAO value to a pixel value of an image.

10. The method of claim 8, wherein the fixed probability is a 50% probability.

11. The method of claim 8, wherein the SAO type parameter indicates that the SAO value is an edge offset value.

* * * * *

UNITED STATES PATENT AND TRADEMARK OFFICE
CERTIFICATE OF CORRECTION

PATENT NO. : 10,142,624 B2
APPLICATION NO. : 14/509199
DATED : November 27, 2018
INVENTOR(S) : Terada et al.

It is certified that error appears in the above-identified patent and that said Letters Patent is hereby corrected as shown below:

In the Specification

Column 3, Line 7, change "Embodiment" to --Embodiment 2.--

Column 5, Line 51, change "9" to --9.--

Column 14, Line 47, change "2is" to --2 is--

Column 19, Line 64, change "light" to --light.--

Signed and Sealed this
Fourth Day of June, 2019

Andrei Iancu
*Director of the United States Patent and Trademark Office*